US012604265B2

(12) United States Patent
Nocete et al.

(10) Patent No.: US 12,604,265 B2
(45) Date of Patent: Apr. 14, 2026

(54) ONGOING POWER AND SMALL CELL POWER OPTIMIZATION

(71) Applicant: DISH WIRELESS L.L.C, Englewood, CO (US)

(72) Inventors: Neil Nocete, Fairfax, VA (US); Dilip Tandekar, Herndon, VA (US); Gurpreet Sohi, Parker, CO (US); Sourabh Gupta, Ashburn, VA (US)

(73) Assignee: DISH Wireless L.L.C., Englewood, CO (US)

( * ) Notice: Subject to any disclaimer, the term of this patent is extended or adjusted under 35 U.S.C. 154(b) by 588 days.

(21) Appl. No.: 18/087,081

(22) Filed: Dec. 22, 2022

(65) Prior Publication Data

US 2024/0214924 A1      Jun. 27, 2024

(51) Int. Cl.
*H04W 52/02*          (2009.01)
(52) U.S. Cl.
CPC ............................... *H04W 52/0206* (2013.01)
(58) Field of Classification Search
CPC ........................... H04W 52/0206; Y02D 30/70
USPC ......................................................... 370/311
See application file for complete search history.

(56) References Cited

U.S. PATENT DOCUMENTS

| | | | |
|---|---|---|---|
| 2022/0292000 A1* | 9/2022 | Xu ...................... | G06F 11/3006 |
| 2022/0407664 A1* | 12/2022 | Wang .................... | H04L 5/0048 |
| 2023/0308892 A1* | 9/2023 | Li .......................... | H04W 76/20 |
| 2024/0023028 A1* | 1/2024 | Nikopour .............. | G06N 3/045 |
| 2024/0039667 A1* | 2/2024 | Khoshnevisan ...... | H04L 5/0051 |
| 2024/0106709 A1* | 3/2024 | Shete .................. | H04L 41/0895 |
| 2025/0013603 A1* | 1/2025 | Kagan .................. | G01D 4/004 |

* cited by examiner

*Primary Examiner* — Jae Y Lee
*Assistant Examiner* — Haeshil Jessica Choi
(74) *Attorney, Agent, or Firm* — Seed Intellectual Property Law Group LLP

(57)          ABSTRACT

A method of controlling ongoing power consumption at a cellular base station includes determining a usage characteristic of the cellular base station, and preparing a notification of the usage characteristic. The method also includes sending the notification to a cloud computing network so as to be recognized by an artificial intelligence cellular base station management program. The method further includes receiving a power consumption instruction from the cloud computer network when the artificial intelligence cellular base station management program evaluates that the notification meets a criteria for changing power consumption at the cellular base station, and effectuating a change in power consumption at the cellular base station by executing the power consumption instruction.

20 Claims, 14 Drawing Sheets

DETERMINE USAGE CHARACTERISTIC
OF CELLULAR BASE STATION — S1300

PREPARE NOTIFICATION OF
USAGE CHARACTERISTIC — S1302

SEND NOTIFICATION TO CLOUD
COMPUTING NETWORK — S1304

RECEIVE POWER CONSUMPTION
INSTRUCTION FROM CLOUD
COMPUTING NETWORK — S1306

EFFECTUATING CHANGE IN POWER
CONSUMPTION BY EXECUTING INSTRUCTION — S1308

PROCESSOR SENDS, TO ANOTHER
CELLULAR BASE STATION, A NOTIFICATION
THAT A USER WITHIN A CELL OF
THE CELLULAR BASE STATION
IS ENTERING A CELL OF THE
OTHER CELLULAR BASE STATION     S1402

PROCESSOR REDUCES THE DETERMINED
USAGE AMOUNT OF THE CELLULAR BASE
STATION TO ACCOUNT FOR THE USER
LEAVING THE CELL OF THE
CELLULAR BASE STATION     S1404

ONGOING POWER AND SMALL CELL POWER OPTIMIZATION

BACKGROUND

Demand for mobile bandwidth continues to grow as customers access new services and applications. To remain competitive, telecommunications companies are cost-effectively expanding their networks while also improving user experience.

Radio access networks (RANs) are an important element in mobile cellular communication networks. However, they often require specialized hardware and software that requires extensive observability to monitor, collect, and store data in order to ensure the systems are running properly and efficiently.

Cell sites (i.e. cellular base stations) including Remote Radio Units (RRUs) provide wireless access to the data network to user equipment (UE). RRUs are a type of Radio Unite (RU), both of which contain RF circuitry, analog-to-digital converters, digital-to-analog converters, etc. . . . to perform wireless communication using a cellular antenna at the cell site. Sometimes, cell sites experience power outages, and service continuity is desired. However, backup power storage is limited.

In traditional wireless network deployment, a telecom site automation system manages power, security, and environmental at the cell site. Events like: DC power supplies and distribution (measurement and control of rectifier, battery and electric loads); environmental conditions (temperature, humidity, leakage, smoke, fire, air flow); and security (access control, intrusion detection, fuel level follow up, tower light control) can be reported by the telecom site automation system through Simple Network Management Protocol (SNMP) messages or traps. SNMP is an application-layer protocol used to manage and monitor network devices and their functions.

A major cost facing the telecom industry is the cost of ongoing power consumption. It is desirable to reduce the power consumption of cellular base stations on an ongoing basis. It is noted that cellular networks increasingly rely on small and micro cells to provide connectivity indoors, improve data transmission speeds, and fill gaps in coverage. The base stations operating the small and micro cells figure importantly in improving overall network energy efficiency.

SUMMARY

Energy efficiency can be improved on an ongoing basis by avoiding unnecessary bandwidth and coverage. Network data demand fluctuates significantly, and networks should be designed to meet performance needs at times of peak demand. Networks that perform well under peak demand are inefficient at times of reduced demand, because bandwidth is going unused. Accordingly, the network management systems should be aware of periods of reduced demand and disable certain services during those periods, to conserve energy. In particular, small and micro cells can be put in a power saving mode or disabled altogether during periods of reduced demand.

However, when and under what circumstances power saving is implemented is a complex and difficult problem to address. Implementing power saving measures at inappropriate times can result in loss of performance, and dissatisfied customers. Improperly implementing a power saving plan by disabling needed equipment represents a waste of the expense of the network equipment. This can be even costlier to a provider than wasting energy to provide unneeded bandwidth.

Certain embodiments include a method of controlling ongoing power consumption at a cellular base station via at least one processor of the cellular base station executing instructions so as to perform a process. The process includes determining a usage characteristic of the cellular base station, preparing a notification of the usage characteristic that is configured to be recognized by an artificial intelligence cellular base station management program operating on a cloud computing network, and sending the notification to the cloud computing network so as to be recognized by the artificial intelligence cellular base station management program. The process additionally includes receiving a power consumption instruction from the cloud computer network when the artificial intelligence cellular base station management program evaluates that the notification meets a criteria for changing power consumption at the cellular base station; and effectuating a change in power consumption at the cellular base station by executing the power consumption instruction.

In some embodiments, the power consumption instruction includes: a first power consumption instruction to turn off transmission of one radio unit of the cellular base station. Further, if a power saving amount from the first power consumption instruction is below a first threshold, the power consumption instruction further comprises a second power consumption instruction to turn off a communication band of the cellular base station. Also, if a power saving amount from the second power consumption instruction is below a second threshold, the power consumption instruction further comprises a third power consumption instruction to switch to one transmitter, four receiver (1T4R) communication.

In some embodiments, the cellular base station includes a power storage, and the power consumption instruction is configured to increase an amount of time the cellular base station operates using the power storage. In such embodiments, the method includes sending operating data to the cloud computing network for calculating a desired size of the power storage.

In some embodiments, the determining the usage characteristic of the cellular base station includes determining a change in quantity of users within a coverage area of the cellular base station.

In some embodiments, the usage characteristic is a current usage amount of the cellular base station. In some embodiments, the power consumption instruction is an instruction to reduce a number of channels operated by the cellular base station or reduce a number of carriers operating on the cellular base station. In some embodiments, the cellular base station is operating a small cell or micro cell. In some embodiments, the artificial intelligence cellular base station management program is an Element Management System (EMS) or Network Management System (NMS). In some embodiments, the artificial intelligence cellular base station management program is a Non-Real-Time Radio Access Network Intelligent Controller (Non-RT RIC).

In some embodiments, the method further includes sending operating data to the cloud computing network; and adjusting operational parameters of the artificial intelligence cellular base station management program using machine learning based on the operating data. Certain embodiments include a cellular base station including a transceiver configured to communicate with at least one user equipment, and a network communicator configured to communicate with a cloud computing network. The cellular base station further includes a processor configured to: determine a usage characteristic of the cellular base station; prepare a notification of the usage characteristic that is configured to be recognized by an artificial intelligence cellular base station management program operating on the cloud computing network; send the notification to the cloud computing network so as to be recognized by the artificial intelligence cellular base station management program; receive a power consumption instruction from the cloud computer network when the artificial intelligence cellular base station management program evaluates that the notification meets a criteria for changing power consumption at the cellular base station; and effectuate a change in power consumption at the cellular base station by executing the power consumption instruction.

In some embodiments, the power consumption instruction includes: a first power consumption instruction to turn off transmission of one radio unit of the cellular base station. Further, if a power saving amount from the first power consumption instruction is below a first threshold, the power saving instruction includes a second power consumption instruction to turn off a communication band of the cellular base station, and if the power saving amount from the second power saving instruction is below the second threshold, the power consumption instruction includes a third power consumption instruction to switch to one transmitter, four receiver (1T4R) communication.

In some embodiments, the cellular base station further includes a power storage. In such embodiments, the power consumption instruction is configured to increase an amount of time the cellular base station operates using the power storage, and the processor is configured to send operating data to the cloud computing network for calculating a desired size of the power storage.

In some embodiments, the determining the usage characteristic of the cellular base station includes determining a change in quantity of users within a coverage area of the cellular base station.

In some embodiments, the usage characteristic is a current usage amount of the cellular base station. In some embodiments, the cellular base station operates a micro cell or a small cell. In some embodiments, the power consumption instruction is an instruction to reduce a number of channels operated by the cellular base station or an instruction to reduce a number of carriers operating on the cellular base station. In some embodiments, the cellular base station is operating a small cell or a micro cell. In some embodiments, the artificial intelligence cellular base station management program is an Element Management System (EMS) or Network Management System (NMS). In some embodiments, the artificial intelligence cellular base station management program is a Non-Real-Time Radio Access Network Intelligent Controller (Non-RT RIC).

DETAILED DESCRIPTION OF EMBODIMENTS

Figure 1:
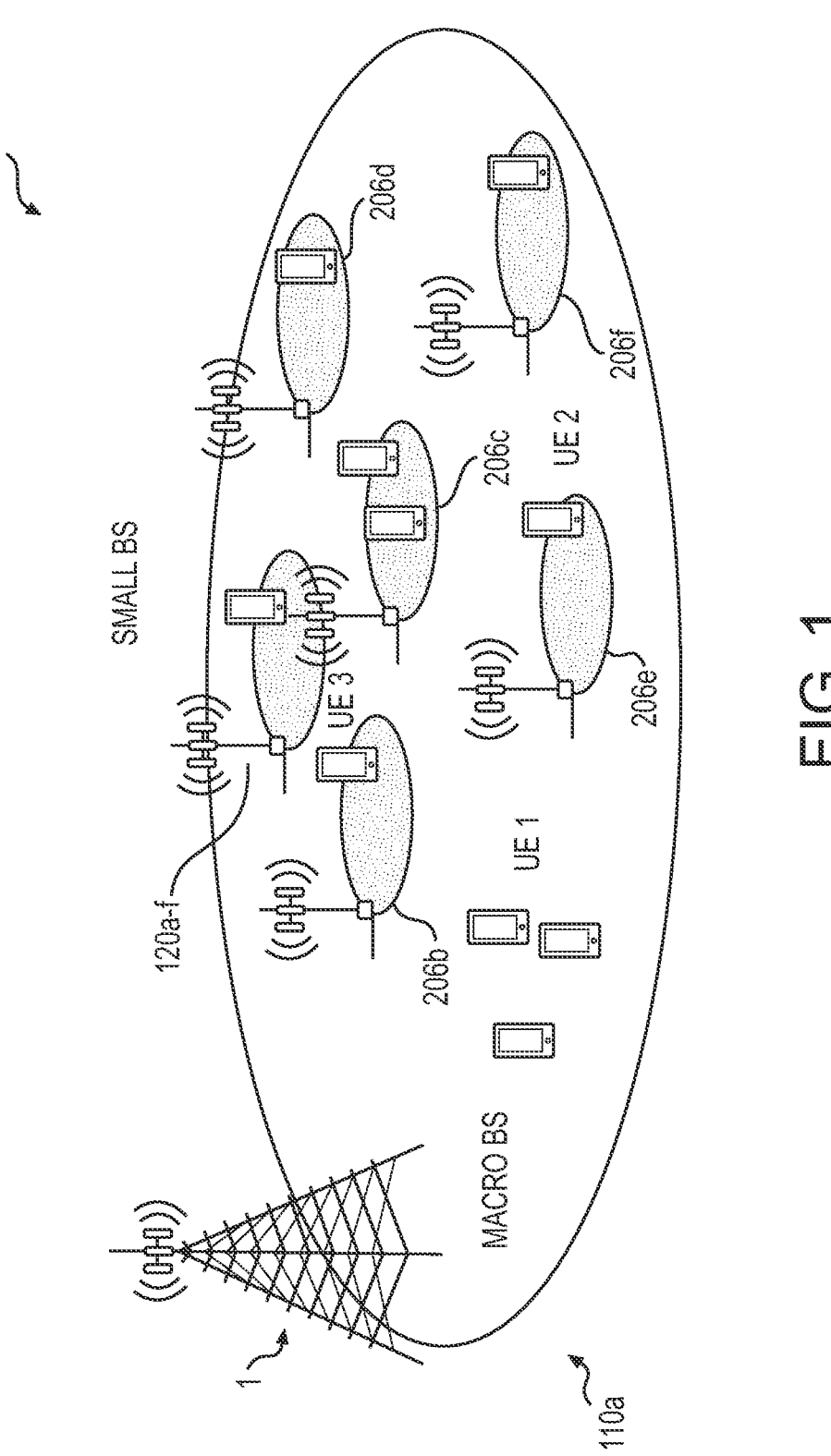
FIG. 1 illustrates a diagram of a portion of a cellular network according to some embodiments.

There are generally three sizes of cells, which are service areas provided by cellular base stations. First is the macro cell, serviced by a macro base station and which may have a traditional cell tower permanently installed on a property or otherwise permanently or removably mounted at a location, and usually having a battery backup storage. The macro cells provide coverage over a broad area and serve as the backbone of the network. Macro cells typically have on an order of 46 dbm, 20 watts of power, and a 2 km radius The other cells are small cells and micro cells, serviced by base stations that are more compact and can be integrated into buildings, light poles, and so forth. Some of these small and micro base stations may be attached to trailers and are referred to as mobile base stations. The small and micro cells fill in the service holes of the macro cells, and provide service inside buildings, inside tunnels, under bridges, and other places where macro cell service is poor. The small and micro cells can also be deployed in areas where extra bandwidth is needed, such as sports stadiums, urban centers, or other areas where large gatherings are expected. The small and micro base stations may or may not have backup battery storage. Small cells typically have on order of a less than 1 km radius. Small cells also often operate a low frequency band such as 3.f Mhz. Micro cells are often on light poles or other existing tower infrastructure and have a smaller radius than a small cell. Micro cells also usually operate on a single band.

Cell sites (i.e. cellular base stations) include macrosites, also known in the art as macro cell sites), which in turn include Remote Radio Units (RRUs) provide wireless access to the data network to user equipment (UE). RRUs are a type of Radio Unit (RU), both of which contain RF circuitry, analog-to-digital converters, digital-to-analog converters, and so forth to perform wireless communication using a cellular antenna at the cell site. Sometimes, cell sites experience power outages, and service continuity is desired. However, backup power storage is limited.

When a power outage in a particular area occurs, power supply is cut over to battery backup power at any affected cell site that has a battery backup. However, due to the cost and maintenance limitations that having battery backups at all cell sites would incur, systems and methods as described herein may allow for an optimized network where cell sites with battery backups are provided at particular locations.

In some instances, an observability framework (OBF) is used to determine which locations, or macrosites, to provide an auxiliary power source at, and to automatically notify the RAN Operations, Administration, and Maintenance (OAM) system of a power outage event or other event affecting power to at least one macrosite and configure the network to utilize such auxiliary power sources to allow for wide network coverage to most or all users for some, most or all available functions despite the event.

Network Structure and Hardware

An exemplary network structure, such as a cellular network structure or a 5G cellular network structure, includes a plurality of macrosites. Each macrosite will include specialized hardware and software to aid in providing cellular service to subscribers.

FIG. 1 is a diagram of a portion of an exemplary 5G or other network 100 having a cell site 110 having a macrosite 110a. Within each portion of the network that is fed by the cell site 110 and corresponding macrosite 110a, there are a plurality of smaller radio cell sites, diagrammed as small cell sites 120a-120f. Each of the macrosite 110a and the small cell sites 120a-120f is allocated a band of frequencies and is served by a base station, which includes a transmitter, receiver and control unit. Adjacent cells are assigned different frequencies to avoid crosstalk or interference. However, cells that are sufficiently distant from each other can use the same frequency band.

The macrosite 110a and small cell sites 120a-f together provide access to the core network for any number of mobile devices and other user equipment. For example, each small cell site 120a-f will receive transmissions from one or more user equipment UE 1, UE 2, UE3. The user equipment may be, for example, a cellular phone including a smart phone, or some other electronic device with cellular service capability such as a tablet, computer, smartwatch, cellular internet router, television, or the like. The range of coverage of the macrosite may extend approximately from about 2 to about 25 miles, or about 5 to about 18 miles, or about 10 miles in any direction. A macrosite may be capable of serving a large town, though in some scenarios the network may include multiple macrosites to handle coverage for a larger area, or where larger frequencies and/or bandwidths are required within a particular coverage area. In some very large cities, hundreds, or even thousands, of macrosites may be positioned in order to provide a desired scope of network coverage to subscribers.

In a 5G network having a portion thereof such as network 100 including a portion as shown in FIG. 1, small cells, for example small cells 120a-f in FIG. 1, complement macrosites, such as macrosite 110a, by providing network capacity for densely populated areas, thereby contributing to the formation of a heterogeneous network. The deployment of each small cell is localized, such that the small cell transmits radio signals to provide cellular and Internet services within small geographic areas. Thus, small cells are ideal for areas where signals are otherwise weak or unavailable.

There are at least three types of small cells, including femtocells, picocells and microcells. These may differ based on size, place of deployment (i.e., indoor or outdoor), range of coverage, and amount of power consumption. For example, a femtocell is typically used indoors, and supports a limited number of users at a coverage range of about 30 feet. Picocells have a range of up to 656 feet and can be mounted as both in indoor and outdoor cell sites. Microcells cover just over a mile, and may be deployed both indoors and outdoors. Femtocells and picocells have low power consumption relative to the high power consumption of macrosites, whereas a microcell has moderate power consumption relative to a macrosite's high power consumption.

Another difference between macro cells and small cells are the frequencies at which they operate. Generally, macro cells operate at lower frequencies which allows their signals to be transmitted across larger areas (i.e. miles), and penetrate buildings and other obstacles. Small cells operate at higher frequencies which facilitates higher bandwidth. However, these higher frequencies are limited in range (i.e. 100 yards), and have difficulty communicating without line of sight due to inferior barrier penetration. Micro cells also operate at higher frequencies and generally provide cell service in an indoor area via a normal internet connection.

Small cells and micro cells also differ from macro cells in the number of bands they operate. Macro cells usually operate in several frequency bands. On the other hand, small cells and micro cells usually operate in fewer or even one band.

Figure 2:
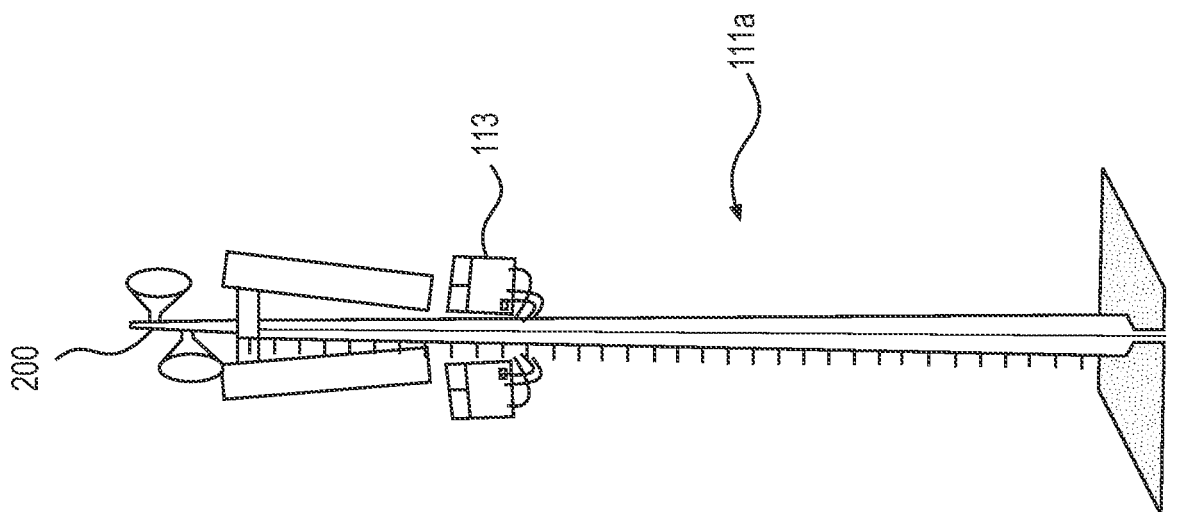
FIG. 2 illustrates a diagram of a cell site within a cellular network according to some embodiments.

FIG. 2 is a detailed view of the hardware provided within the exemplary macrosite 110a. In a macrosite, the RU device or RRU 113 is mounted on a cell tower 111a that is higher than the surrounding buildings or terrain to avoid obstruction to signals transmitted to and received from the macrosite. In other words, cell tower 111a elevates antenna 200 so that it can transmit over terrestrial obstacles.

Figure 3:
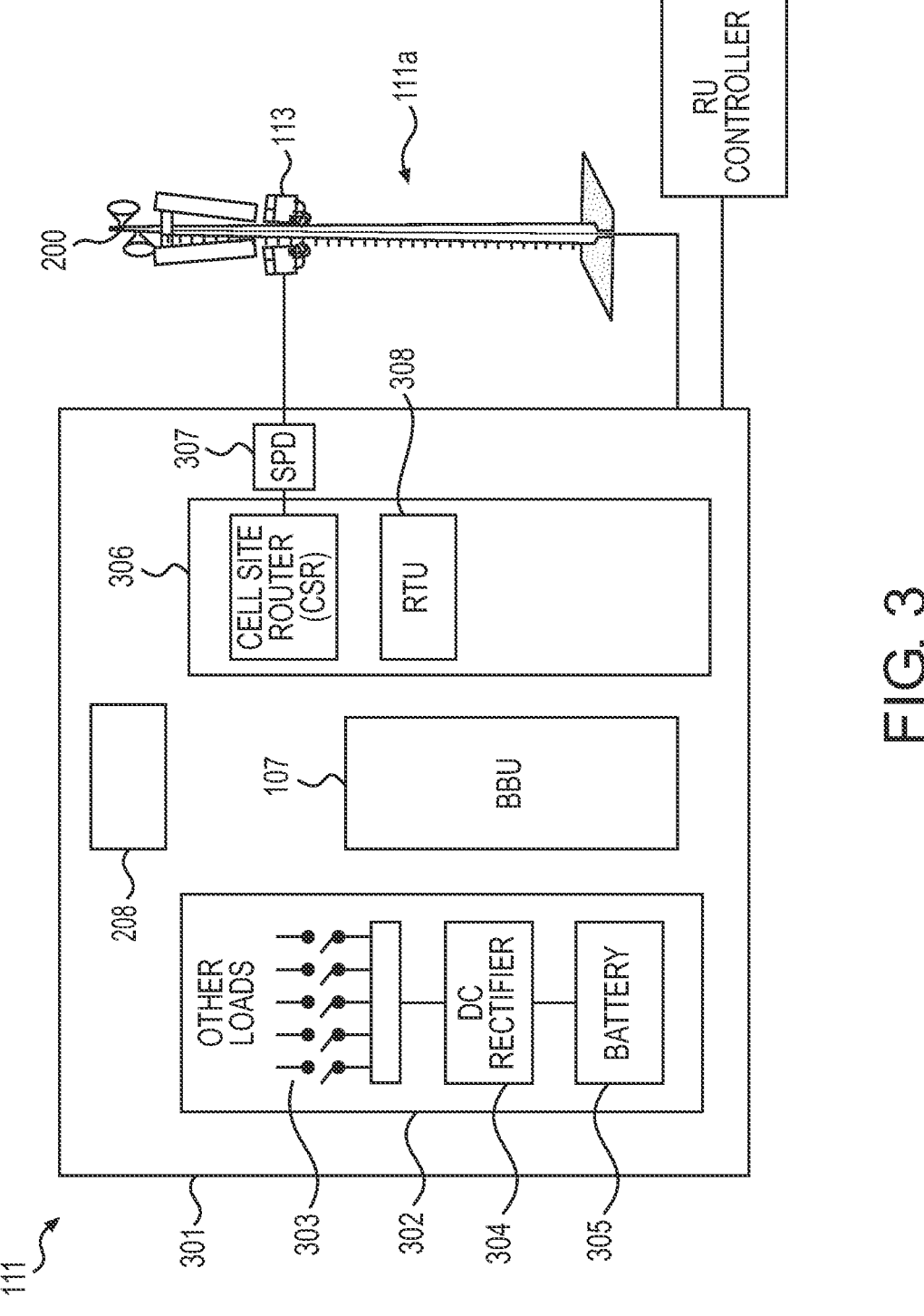
FIG. 3 illustrates a diagram of hardware within a housing of the cell site of FIG. 2.

FIG. 3 is a detailed view of the hardware and software provided within the exemplary macrosite 110a. Referring to FIG. 3, each macrosite 110a is a subset of the cell site 110, and can be implemented as or include an RAN base station 111, which is a cellular-enabled (including 5G enabled) mobile device site where antennas 200 and electronic communications equipment are placed to create a cell, or adjacent cells, in the cellular network. The basic structure of the RAN base station 111 includes a baseband unit (BBU) 112, a radiofrequency processing unit (i.e., a radio unit (RU) device) 113, one or more antennas 200, and software-based interfaces, described in more detail later.

The RAN base station 111 is a RAN element that performs radio transmission and reception in one or more cells to or from the user equipment. Specifically, the RAN base station 111 includes a tower 111a, and provides signals to the user equipment (e.g., some or all of the UE1-UE3 in FIG. 1, and others), and wirelessly interfaces the user equipment to the RAN infrastructure. The RAN base station 111 can have an integrated antenna, or as shown in FIG. 2, can have a connection to the antenna 200 by feeder cables. In the exemplary macrosite 110a illustrated in FIG. 2, the RAN base station 111 includes: an antenna-feeder system, which has one or more antennas 200 mounted to the tower 111a or mast; one or more RU devices such as RRU 113 mounted on the cell tower 111a or mast; a BBU 112; and a support system consisting of various other types of equipment, as described in more detail below.

The support system of the RAN base station 111 may include elements such as an air conditioner, power supplies, modems or routers, surge protector, remote terminal unit (RTU) device, and other equipment (not shown). As shown in FIG. 3, for example, in addition to the BBU 112, enclosed within equipment housing 301 are: a power supply 302, which includes a DC rectifier 304 and, in some cases, an auxiliary power unit. In some examples, the auxiliary power unit is implemented as at least one backup battery 305. As described in further detail herein, some, but not all, macrosites within the network may include such an auxiliary power unit.

The equipment housing 301 may also house switches 303, which provide connectivity between the power supply 302 and equipment on the cell site requiring power; a cell site router (CSR) 306, which provides connectivity between the RAN and the 5G core network by aggregating traffic from the BBU and then backhauling the traffic over an aggregation network to the core network; a surge protective device (SPD) for providing lightning and surge protection for the base station and cell sites; and a remote terminal unit (RTU) device 308.

In normal operation, power delivery to the RAN base station 111 may be supplied via the power supply 302 as AC power from a public utility or other sources. The AC power is rectified via the rectifier 304 and regulated to a nominal measured DC voltage, which may also be fed to the backup battery 305 or a set of backup batteries for charging. The rectifier 304 includes circuitry to keep the batteries fully charged and ready in case of a commercial power interrupt or failure. At full charge, the backup battery may be kept at a voltage of about 50 volts. However, vendors or operators may opt for a DC voltage of −24V or other DC voltage setting and not the typical 48V setting. The battery pack parameter, in general, per customer's requirement, is in the order of 2-hour work time or other operator backup time settings (e.g., the operators may choose a 2-hour battery backup, 4-hour or 8-hour, etc., as desired or required for operations) under 100 W (in this case, the power is calculated per RU power consumption and is a variable quantity) AC system, 48.1V/65 Ah battery that can last for about 150 minutes with a full load. Base stations may use a 48V input supply that is stepped down by DC/DC converters to 24V or 12V, that can be reduced to meet the DC voltage level of each module.

Figure 4:
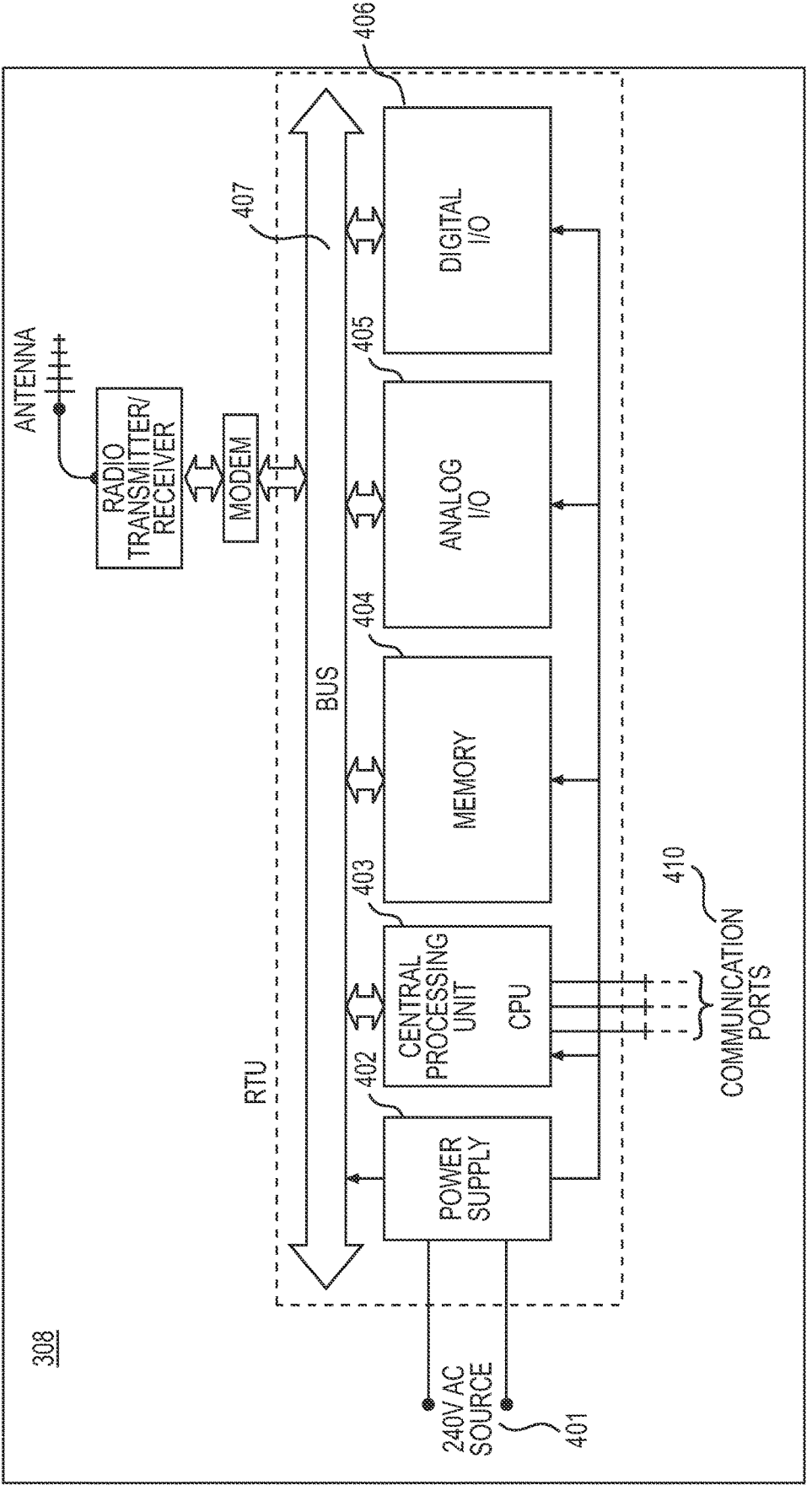
FIG. 4 illustrates a diagram showing components of a remote terminal unit housed within the cell site of FIG. 2.

The RTU device 308 is a control device that monitors, controls, and automates multiple variables and field devices at the base station. Such field devices may include actuators, sensors, and any other supporting equipment housed at the base station. An exemplary RTU device 308 is shown in the diagram of FIG. 4. As illustrated, the RTU device 308 includes: a power supply 402, which is supplied by a power source 401; one or more central processing units (CPU) 403; communication ports 410; a memory 404, which includes volatile and non-volatile memory; analog input/output modules 405; and digital input/output modules 406, where the digital input modules capture status and alarm signals coming from field devices, and the digital output modules send signals and commands to the field devices. The RTU device 308 interfaces with the field devices via a bus 407.

Network Software

Figure 5:
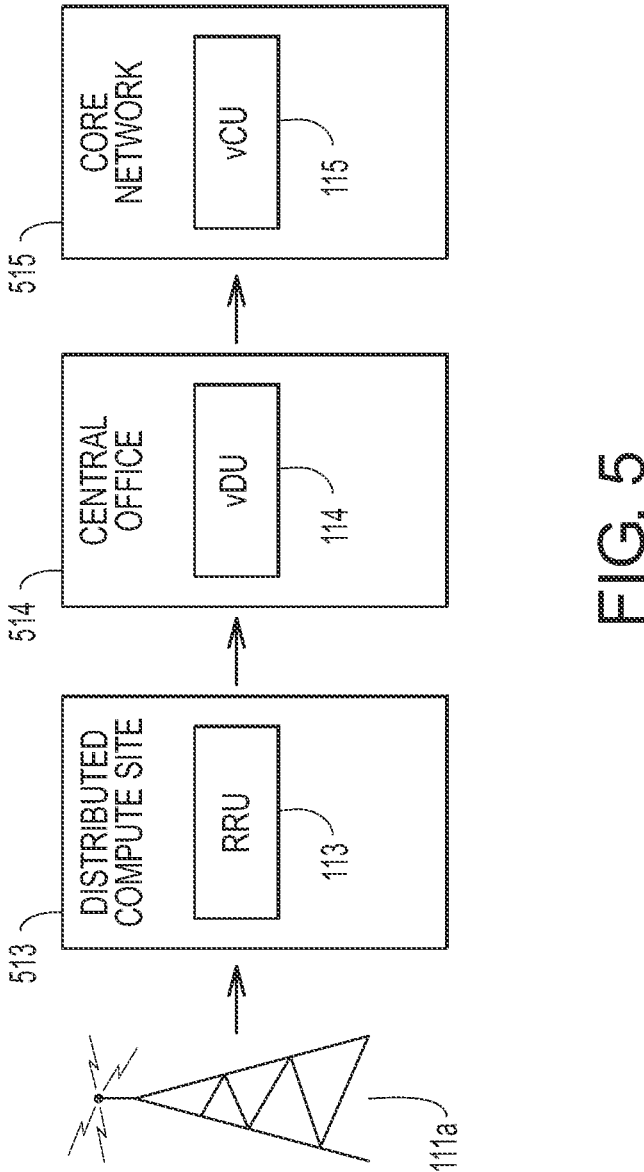
FIG. 5 illustrates a high level block diagram of a cellular network using a remote radio unit, a virtualized distributed unit and a virtualized centralized unit according to some embodiments.

As shown in FIG. 5, the RAN base station 111 (e.g., as part of macrosite 110a shown in FIG. 1) is provided with software as described herein. The RAN base station 111 includes a tower 111a and hardware as discussed with reference to FIG. 2. The RAN base station 111 also includes a radio unit (RU) or remote radio unit 113, and, either onsite or connected thereto, a virtualized distributed unit (vDU) 114, and a virtualized central unit (vCU) 115. In some embodiments, the vDU may simply be a distributed unit (DU), and the vCU may simply be a centralized unit (CU), though the embodiments described herein utilize virtualized units.

In the embodiment shown in FIG. 5, the vDU 114 is housed within a central office 514, which may be at the local macrosite or may be at a centralized location where one or more vDUs operating with one or more macrosites are housed. In the embodiment, the vCU 115 is housed within a core network 515, which may be at the local macrosite or may be at a centralized location where one or more vDUs operating with one or more macrosites are housed.

More specifically, FIG. 5 illustrates a system that delivers full RAN functionality using network functions virtualization (NFV) infrastructure. This approach decouples baseband functions from the underlying hardware and creates a software fabric. Within the solution architecture, virtualized baseband units (vBBUs) process and dynamically allocate resources to RRUs 113 based on the current network needs. Baseband functions are split between vCUs 115 and vDUs 114 that can be deployed in the central office 514 or another aggregation center using a distributed architecture, such as using kubernetes.

In this embodiment, the RRU 113 is located at a distributed compute site 513, possibly at the macrosite 110a. The macrosite 110a is a location containing the antennas 200, RRU 113, and network connectivity equipment and power storage equipment described with reference to FIGS. 1-4.

RRU 113 contains a transceiver for wirelessly communicating with User Equipment (UEs), such as UE1-UE3 in FIG. 1. The vDU 114 is located at a central office 514 or local data center of the network provider. The vCU 115 is part of the core network 515 and may be a software entity that operates over a network of cloud servers.

As a nonlimiting example, the network of cloud servers, defined in more detail later, may comprise a physical, virtual, or combination of physical and virtual infrastructure whereby one or more servers can be divided, using virtualization software often including a hypervisor, into plural virtual servers. These virtual servers can include public and/or private cloud servers, and be tied to one or more processors, which can be hardware hosted at the physical server or elsewhere, and can then be accessed through the internet. In embodiments, the servers and processors together create a cloud-based architecture that can perform the functions described herein.

The distributed compute site 513 also includes a site controller and site router (i.e. network communicator). The site controller includes a processor configured to execute certain local control functions, which will be detailed further herein. The site router connects the cell site to the cellular network controllers, and provides internet service to the cell site which is distributed to the UEs wirelessly via the RRU 113.

vCUs 115 and vDUs 114 run as virtual network functions (VNFs) within the NFV infrastructure. The entire software stack that is needed is provided for NFV, including open source software. This software stack and distributed architecture increases interoperability, reliability, performance, manageability, and security across the NFV environment.

RAN standards use deterministic, low-latency, and low-jitter signal processing. These are achieved using kubernetes clusters, described later, to control each RAN. Moreover, the RAN may support different network topologies, allowing the system to choose the location and connectivity of all network components. Thus, the system allowing various vDUs 130 on kubernetes clusters allows the network to pool resources across multiple cell sites 110, scale capacity based on conditions, and ease support and maintenance requirements.

Figure 6:
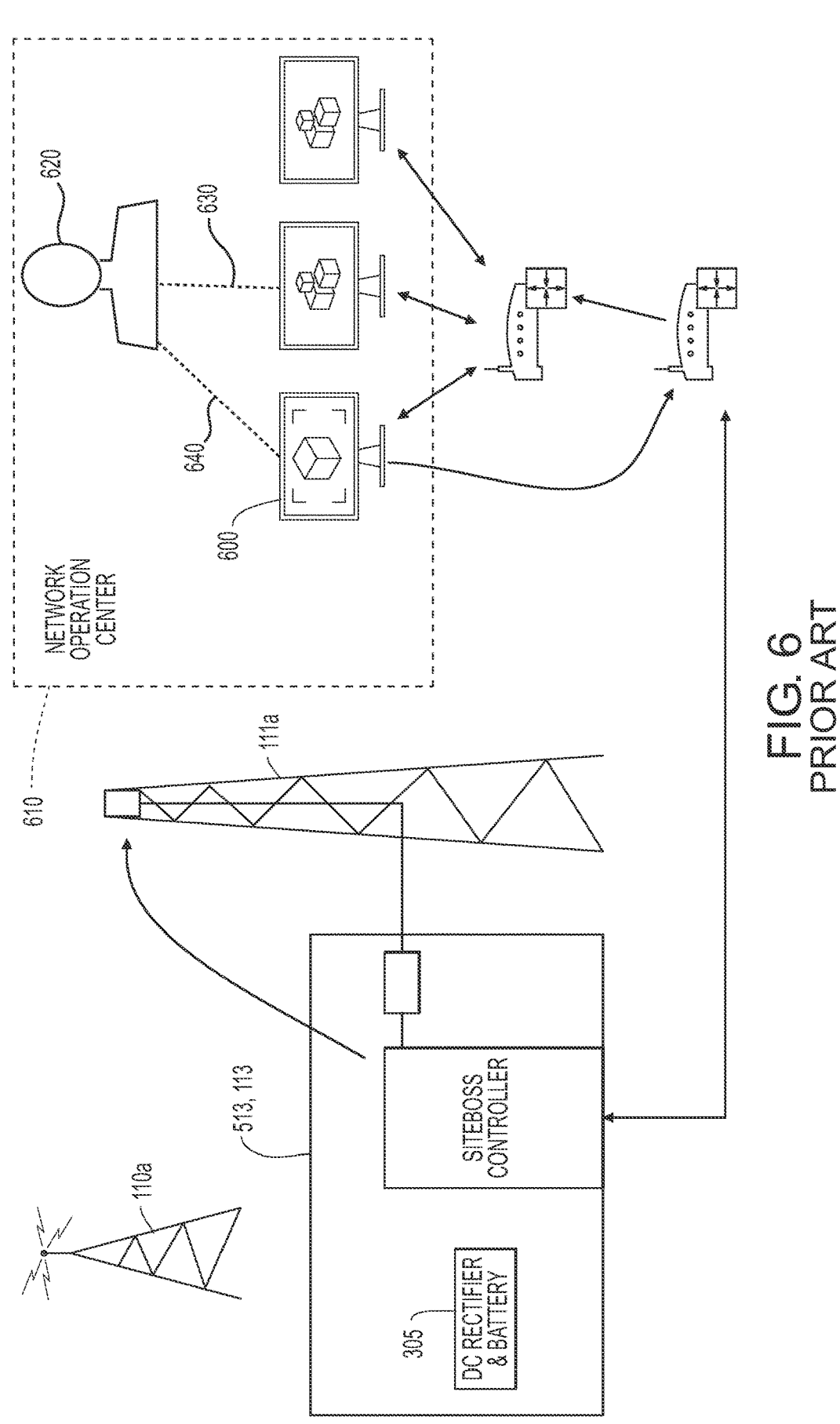
FIG. 6 illustrates a block diagram of a prior art cellular network.

FIG. 6 shows a diagram of a prior art cellular network. A macrosite 110a contains the radio tower 111a and a distributed compute site 513 containing RRU 113. An event (such as a power outage) is detected either at the macrosite 110a or elsewhere. An alert 630 of the event is sent to the EMS (Element Management System) or NMS (Network Management System) 600. In the prior art, EMS/NMS was implemented on a proprietary server at the network operation center (NOC) 610.

In the prior art cellular network, a human controller 620 observes alert 630, and issues a command (e.g. power saving command) 640 which is relayed back to compute site 513. The site controller, also called a site boss controller, and which may include a hardware processor and a memory that stores instructions for the processor to implement, then implements the command 640. In the example of a power outage, the power saving command would be tailored to conserve power in a battery storage, such as an auxiliary power unit or battery backup 305, that serves as backup power for macrosite 110*a*.

In traditional wireless network deployment, a telecom site automation system manages power, security, and environmental at the cell site. Events like: DC power supplies and distribution (measurement and control of rectifier, battery and electric loads); environmental conditions (temperature, humidity, leakage, smoke, fire, air flow); and security (access control, intrusion detection, fuel level follow up, tower light control) can be reported by the telecom site automation system through Simple Network Management Protocol (SNMP) messages or traps. SNMP is an application-layer protocol used to manage and monitor network devices and their functions.

These SNMP traps are received by a network operator using the NOC to collect the events. The NOC then provides critical statistics for each monitored device in operator's network. In traditional operation, NOC is monitored and operated by a human being, who issues control instructions to the cell site or RRU based on the observed statistics.

Figure 7:
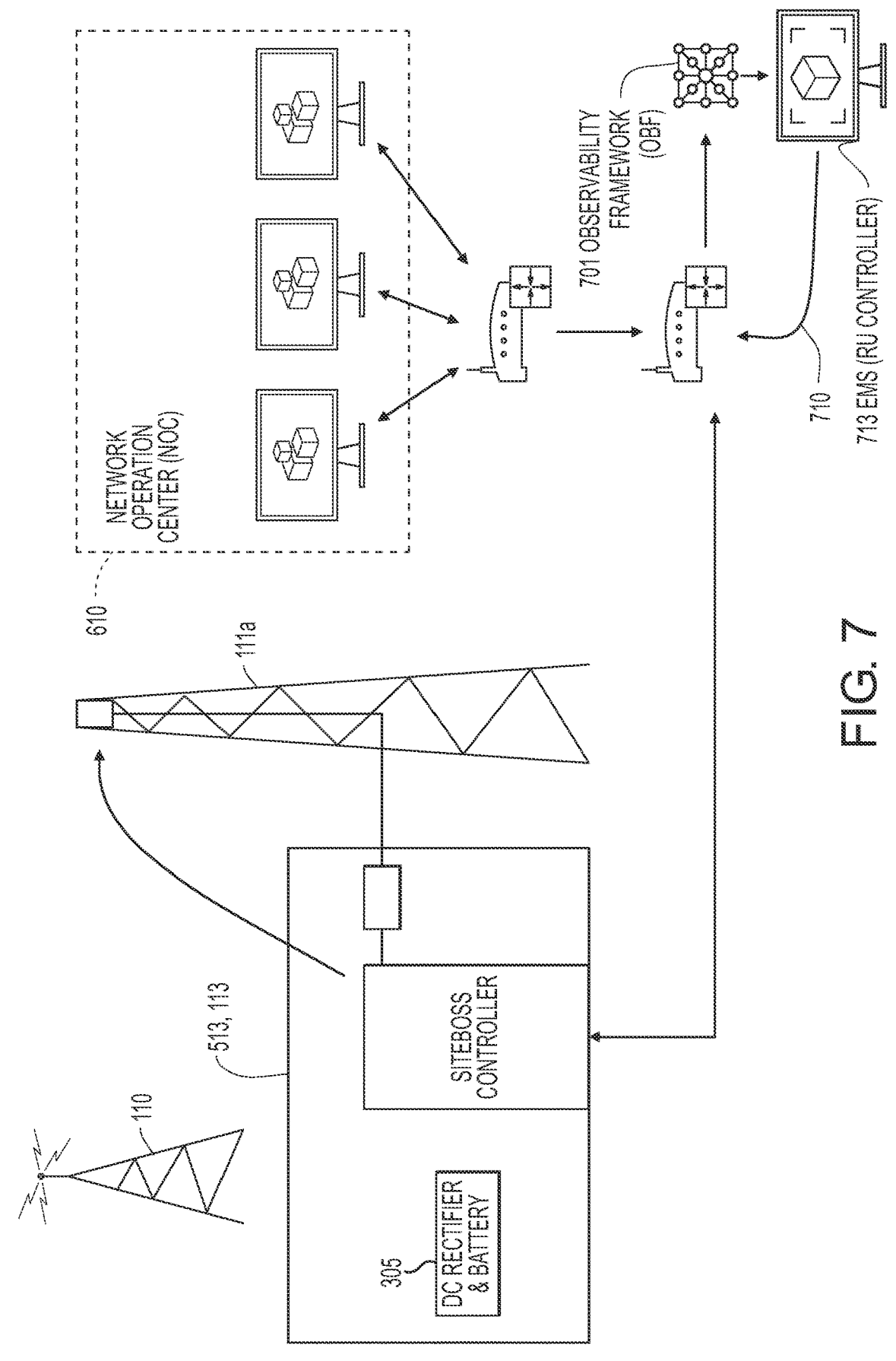
FIG. 7 illustrates a block diagram of a cellular network according to some embodiments.
Figure 8:
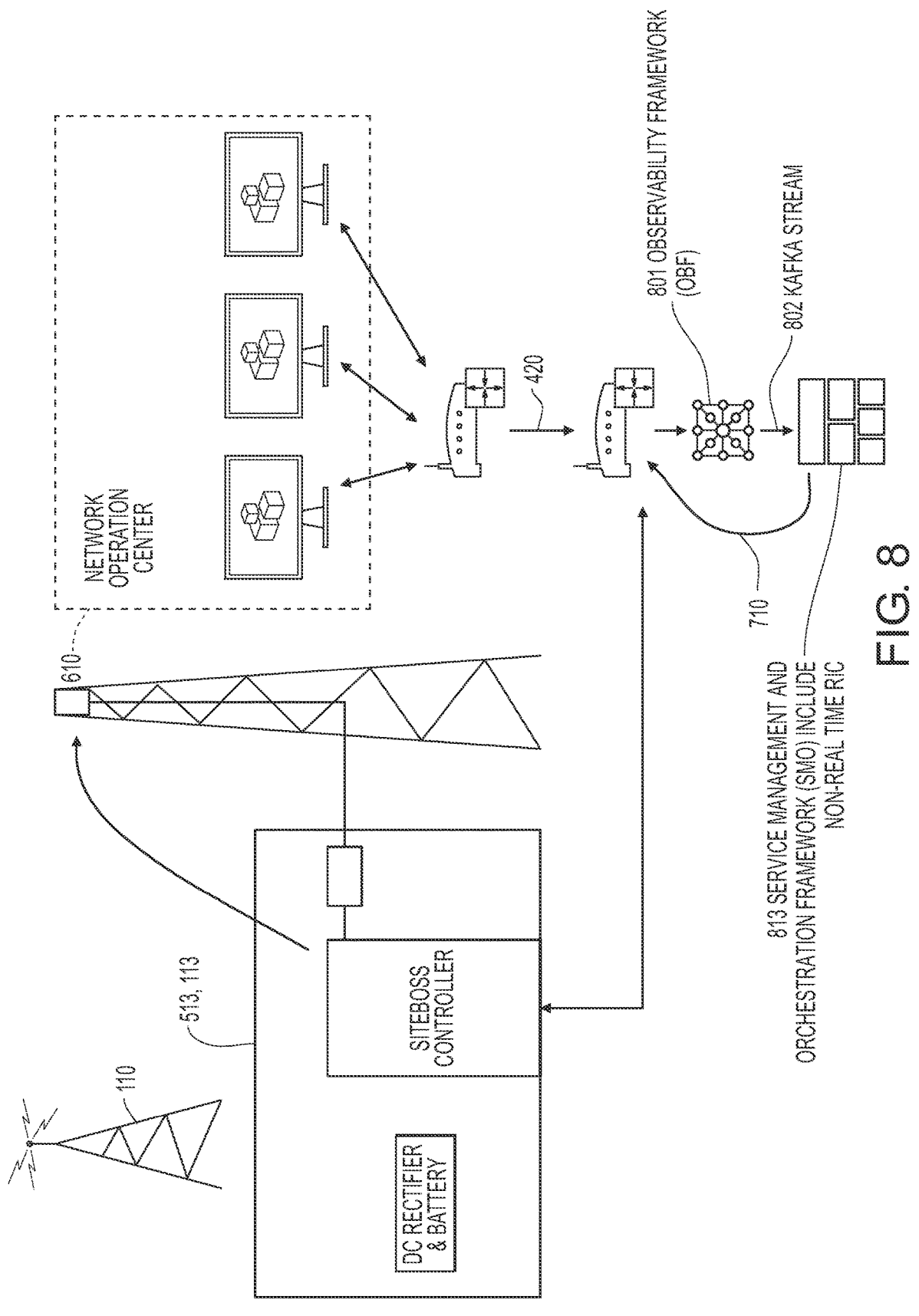
FIG. 8 illustrates a block diagram of a cellular network according to some embodiments.

FIGS. 7 and 8 show cellular networks according to embodiments herein. Traditionally, cell site events including power outages are sent to the NOC 210. However, in embodiments herein, the event is also sent from telecom site automation system to OBF 701/801 by adding the OBF IP address in a SNMP trap destination. When OBF 701/801 receives the SNMP trap, OBF 701/801 can convert/replicate the traps to events 420 for event store/stream-processing software. The event store/stream-processing software can be built into the OBF 701/801.

After the event store/stream-processing catalogues these events 420, they can be handled in one of two ways described below, and shown in FIGS. 7 and 8, respectively.

EMS/NMS Built-in Intelligence Monitoring and Control

While the network is running the support module will collect various data to ensure the network is running properly and efficiently. This observability framework ("OBF") collects telemetry data from all network functions that will enable the use of artificial intelligence and machine learning to operate and optimize the cellular network.

This adds to the telecom infrastructure vendors that support the RAN and cloud-native technologies as a provider of Operational Support Systems ("OSS") services. Together, these OSS vendors will aggregate service assurance, monitoring, customer experience and automation through a singular platform on the network.

The OBF brings visibility into the performance and operations of the network's cloud-native functions ("CNFs") with near real-time results. This collected data will be used to optimize networks through its Closed Loop Automation module, which executes procedures to provide automatic scaling and healing while minimizing manual work and reducing errors.

FIG. 7 shows a diagram of a cellular network according to embodiments herein. As discussed above, the operating parameters of the RRU or RRUs 113 operating the cells are monitored. In embodiments herein, the OBF 701/801 operates to collect telemetry data from all network functions. This, in combination with the use of cloud computing, enables the use of artificial intelligence and machine learning to operate and optimize the cellular network. One of the functions of the OBF 701/801 is to collect SNMP traps and convert them to events such as power-related events, which cloud based network management software can recognize.

In the embodiment of FIG. 7, EMS (Element Management System) or NMS (Network Management System) 713 are cloud based network functions. This software communicates with the RRU 113 via the OBF 701/801 in order to alert the artificial intelligence network manager of an event (e.g. power outage) at the RRU 113. In some embodiments, the EMS/NMS 713 acts as a controller of the RRU 113.

These events can be sent to, recognized by, and acted upon by the EMS/NMS 713. The EMS/NMS 713 can directly subscribe to cell site power outage topics in the event store/stream-processing software. Hence, when an event such as a cell site power outage occurs, the built-in intelligence of the EMS/NMS 713 will receive the event through the subscription, will identify cells impacted by the event, and will send Remote Procedure Call (RPC) commands 710 to RRUs 113.

These RPC commands 710 instruct the RRUs 113 to either reduce transmission power or shut down some channels/carriers. This allows the backup battery 305 at the cell site 110 to last a longer time through control of the overall RRU power consumption.

Non-Real-Time RAN Intelligent Controller Monitoring and Control

FIG. 8 shows a diagram of a cellular network according to embodiments herein. In this embodiment, instead of using the EMS/NMS 713 to monitor and respond to events, a Non-Real-Time RAN Intelligent Controller (Non-RT RIC) 813 performs this function utilizing a kafka stream 802 to receive data from OBF 701/801.

The Non-RealTime RIC 813 is an Orchestration and Automation function described by the O-RAN Alliance for non-real-time intelligent management of RAN (Radio Access Network) functions. The primary goal of the Non-RealTime RIC 813 is to support non-real-time radio resource management, higher layer procedure optimization, policy optimization in RAN, and providing guidance, parameters, policies and AI/ML models to support the operation of near-RealTime RIC functions in the RAN to achieve higher-level non-real-time objectives. NONRTRIC functions include service and policy management, RAN analytics and model-training for the near-RealTime RICs.

The Non-RealTime RIC 813 can communicate with near-RealTime RIC elements in the RAN via an A1 interface. Using the A1 interface the NONRTRIC can facilitate the provision of A1 Policies; monitor and provide basic feedback on policy state from near-RealTime RICs; provide A1 Enrichment Information as required by near-RealTime RICs; act as a hosting platform for rApps (Non-RealTime RIC applications); host the R1 interface between rApps and the underlying SMO and Non-RT-RIC platforms; and manage the exposure towards rApps of SMO platform functions, Non-RT-RIC platform functions, and the capabilities of other rApps. The NONRTRIC functions support non-real-time control of the RAN (Radio Access Network).

In the embodiment of FIG. 8, these events (i.e. cell-site events stored in the event store/stream-processing software)

can be sent to, recognized by, and acted upon by the Non-RT RIC 813. The Non-RT RIC 813 can directly subscribe to cell site power outage topics in the event store/stream-processing software.

Integration with a Cloud-Based Network

Hence, when cell site power outage occurs, the Non-RT RIC 813 sends RPC commands 710 through the O1 interface (e.g., an O1 Observability CM/FM/PM Liaison) to RRUs 113 to either reduce transmission power or shut down some channels/carriers. This allows the backup battery 305 at the cell site 110 to last a longer time through control the overall RRU and cell power consumption.

Traditional cellular networks use a centralized or proprietary server to connection the various RRUs 113 to the internet. This arrangement limits the computational power of the network controller. As a result, as shown in FIG. 6, a human controller 620 is needed to handle network events such as cell power outages. These human controllers 620 are expensive and have performance limitations, including slow reaction times, lack of situational awareness, and human error.

One potential solution would be to implement an artificial intelligence software-based network controller. However, the network control/access servers presently used on cellular networks lack the computational power to perform such functions. Moreover, their geographic remoteness from some of the RRUs in the network limits their ability to quickly react to problems in distant parts of network.

Embodiments herein use a cloud-based network instead of a traditional server for network control and access operations. The computational power of the cloud-based network enables the use of artificial intelligence and machine learning network control software. Also, RRUs in all parts of the network can be controlled in a time-effective manner by this system, because the cloud-based servers are spread over a wide geographic area. Therefore, RRUs can be controlled by software operating on a relatively nearby cloud server. This configuration is what allows the network control software described herein to perform functions that cannot be performed by either a human being or a generic computer.

To implement this system, software is installed over a large number of cloud-based servers. This is accomplished by using a kubernetes cluster. A kubernetes cluster is a set of nodes that run containerized applications. Containerizing applications is an operating system-level virtualization method used to deploy and run distributed applications without launching an entire virtual machine (VM) for each application.

A cluster configuration software is available at a cluster configuration server. This guides a user, such as system administrator, through a series of software modules for configuring hosts of a cluster by defining features and matching hosts with requirements of features so as to enable usage of the features in the cluster. The software automatically mines available hosts, matches host with features requirements, and selects the hosts based on host-feature compatibility. The selected hosts are configured with appropriate cluster settings defined in a configuration template to be part of the cluster. The resulting cluster configuration provides an optimal cluster of hosts that are all compatible with one another and allows usage of various features. Additional benefits can be realized based on the following detailed description.

The present application uses such kubernetes clusters to deploy a RAN base station 111 so that the vDU 114 corresponding to the RAN base station 111 is located at one kubernetes cluster and the vCU 115 is located at a remote location from the vDU 114. This configuration allows for a more stable and flexible configuration for the RAN base station 111 and cell site 110 generally.

The cell sites, including cell site 110, provide cellular service to the client devices (e.g., user equipment U1-U3) through the use of a vDU 114 and a tower 111a. The server at a cell site 110 controls the vDU 114 located at the cell site 110, which in turn controls communications from the tower 111a. The or each vDU 114 includes software to control the communications with the towers 111a, RRUs 113, and vCU 115 so that communications from client devices (user equipment or UEs) can communicate from one tower 111a through the kubernetes clusters to another cellular tower. In other words, the voice and data from a UE transmits to the towers 111a and then goes through the vDU 114 to transmit such voice and data to another vDU 114 to output such voice and data to another tower 111a. This allows transmission from one UE to another UE.

Artificial Intelligence & Machine Learning Software

Figure 9:
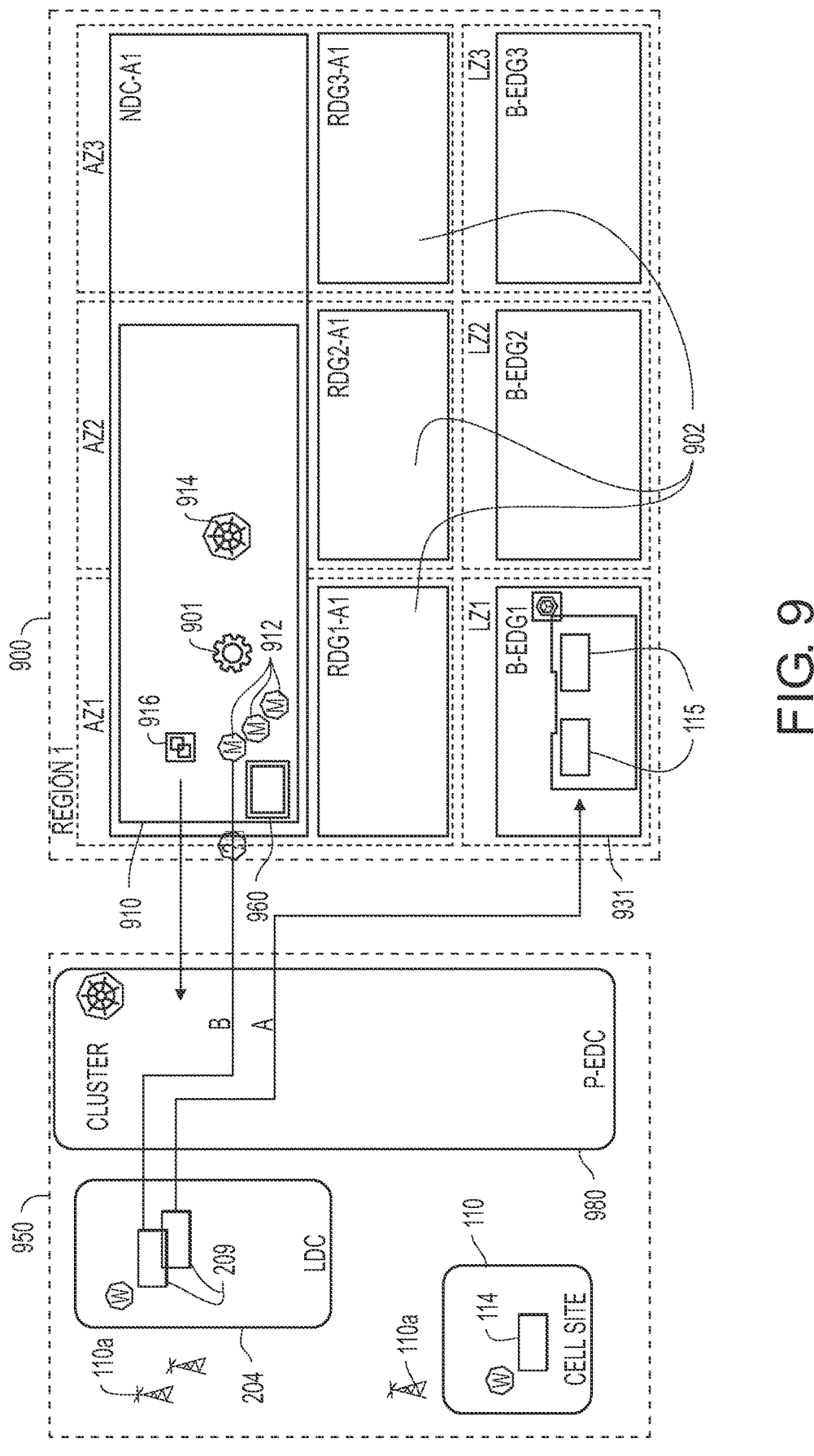
FIG. 9 illustrates a block diagram of stretching the kubernetes clusters from a public network to a private network, according to various embodiments.

The software architecture of embodiments herein is shown in FIG. 9. Here, the vDUs 114 on each individual cell site 110 or central office 514/Local Data Center (LDC) may not have enough computing power to run a control plane that supports the functions in the mobile telecommunications system to establish and maintain the user plane. As such, the control plane is then run in a location that is remote from the cell sites 110, such as a Regional Data Center (RDC) 902. The RDC 902 is implemented on a cloud-based public network 900. This control plane can be e.g. artificial intelligence network control software.

The RDC 902 is the management cluster which manages the central office 514 and a plurality of cell sites, one of which is depicted as cell site 110. As mentioned above, the control plane may be deployed in the RDC 902. The control plane maintains the logic and workloads in the cell sites from the RDC 902 while each of the kubernetes containers is deployed at the cell site 110. The control plane also monitors that the workloads are running properly and efficiently in the cell site 110 and fixes any workload failures. If the control plane determines that a workload fails at the cell site 110, for example, the control plane may redeploy the workload on the cell site 110, for example to another of the cell sites or another component connected to the public network 900.

The RDC 902 may include a kubernetes master 912 (or kubernetes master module), a kubernetes management module 914 and a virtual (or virtualization) module 916. The master module 912 monitors and controls the kubernetes workers and the applications running thereon, such as the vDUs 114. If a vDU 114 fails, the master module 912 recognizes this, and will redeploy the vDU 114 automatically. In this regard, the kubernetes clusters system has intelligence to maintain the configuration, architecture and stability of the applications running. In this regard, the kubernetes clusters system may be considered to be "self-healing" or "machine learning."

The artificial intelligence network control software can operate by generating a model of the radio access network and associated components such as RAN base station 111. The software can then be run under simulation conditions in order to perform machine learning. During the simulated operation of the network controller, optimization of the operating parameters is performed in order to improve performance of the network control software. For example, a simulation of the battery storage level of RRUs in a network can be run on the network control software prior to implementation.

The network control software then issues different RPC commands to the RRUs under simulation using different power saving measures (discussed further below). The software can determine after several simulation runs which approach resulted in the best power savings, longest service maintenance, better network speeds, and so forth. These simulations can include power outages of different durations, and in different geographic areas of the network. Repeatedly performing such simulations and modifying the operating parameters of the software to optimize results constitutes software machine learning.

Furthermore, once the network control software is implemented, further improvements can be made in a similar fashion as in under simulation conditions. Thus, the performance of the network can be incrementally improved over its operating life.

The management module 914 along with an Automation Platform 901 creates the kubernetes clusters in the central office 514 and cell sites 110. For each of the vDUs 114 in the central office 514 and the cell sites 110, an operating system is loaded in order to run the kubernetes workers. The vDUs 114 are also implemented by software that runs on the kubernetes workers. In this regard, the software layers are the operating system, and then the kubernetes workers, and then the vDUs 114.

The central office 514 may be a local data center that can support multiple vDUs 114 and multiple towers 111a for cellular communications. The central office 514 is similar to the cell sites 110 except that each central office has multiple vDUs 114 and multiple towers 111a associated therewith. Each server in the central office 514 (as compared with the vDU 114 in each cell site 110) may support multiple towers 111a. The server in the central office 514 may be different from the server in the cell site 110 because the servers in the central office may be larger in memory and processing power (for example number of cores) relative to the servers in the individual cell sites 110. In this regard, each server in the central office 514 may run multiple vDUs 114. In some embodiments, each server may run 2 or more, or 3 or more, or exactly 2 vDUs 114, where each of these vDUs 114 independently operates a cell tower 111a. Thus, multiple towers 111a can be operated through the central office 514 using multiple vDUs using the kubernetes clusters. The central office 514 or multiple central offices may be placed in bigger metropolitan areas whereas individual cell sites 110 may be placed at smaller population areas.

FIG. 9 also illustrates cell sites 110 that are configured to be clients of each cluster. Each cell site 110 is shown as including a cellular tower 111a and a connection to each distributed unit (DU), similar to FIG. 5. Each DU is labeled as a virtualized distributed unit (vDU) 114, similar to FIG. 5, and each vDU runs as virtual network functions (VNFs) within the an open source network functions virtualization (NFV) infrastructure.

Regionalized Network Implementation

FIG. 9 also illustrates a block diagram of stretching the kubernetes clusters from a public network (e.g. cloud-based network) 900 to a private network 950 and across the availability zones, according to various embodiments.

This is done by the automation platform module 901 creating master modules 912 in the control plane 910 located within the public network 900. The kubernetes clusters are then created as explained above but are created in both public and private networks 900, 950.

The public network 900 shown in FIG. 9 shows an exemplary embodiment where there are three availability zones AZ1, AZ2 and AZ3. These three availability zones AZ1, AZ2 and AZ3 are in three different geographical areas. For example, AZ1 may be in the western area of the United States, AZ2 may be in the midwestern area of the United States, and AZ3 may be in the eastern area of the United States.

A national data center (NDC) 920 is shown as deployed over all three availability zones AZ1, AZ2 and AZ3 and the workloads will be distributed over these three availability zones AZ1, AZ2 and AZ3. It is noted that the NDC is a logical creation of the data center instead of a physical creation over these zones. The NDC is similar to the RDC 902 but instead of being regional, it is stretched nationally across all availability zones.

It is noted that the control plane 910 stretches across availability zones AZ1 and AZ2 but could be stretched over all three availability zones AZ1, AZ2 and AZ3. If one of the zones fails the control plane 910 would automatically be deployed on the other zone. For example, if zone AZ1 fails, the control plane 910 would automatically be deployed on AZ2. This is because each of the software programs which are deployed on one zone are also deployed in the other zone and are synced together so that when one zone fails, the duplicate started software automatically takes over. This creates significant stability.

Moreover, because the communication is to and from a private network, the communications between the public and private networks may be performed by pre-authorizing the modules on the public network to communicate with the private network.

The private network 950 includes the central office 514 and cell sites 110 as well as an extended data center (EDC) 980. The central office 514 and cell sites 110 interact with the EDC 980 as the EDC 980 acts a router for the private network 950. The EDC 980 is configured to have a concentration point where the private network 950 will extend from. All of the central offices 514 and cell sites 110 may connect to only the EDC 980 so that all of the communications to the private network 950 can be funneled through one point. This may improve security and/or efficiency.

The kubernetes master modules 912 control the vDUs 114 so that the clusters are properly allowing communications between the private network 950 and the public network 900. There are multiple master modules 912 so that if one master module fails, one of the other master modules takes over. For example, as shown in FIG. 9, there are shown three master modules 912 and all three are synced together so that if one fails, the other two are already synced together to automatically become the controlling master. However, the number of master modules 912 is not so limited and may be only 1, or 2, or 3, or 4 or more.

Each of the master modules 912 performs the functions as discussed above, including creating and managing the vDUs 114. This control is shown over path B which extends from a master module 912 to each of the vDUs 114. In this regard, the control and observability of the vDUs 114 occurs only in the public network 900 and the vDUs 114 and the kubernetes clusters are in a private network 950.

There is also a module for supporting functions and Platform as a Service (PaaS) 960 (the support module 960). There are some supporting functions that are required for observability and this support module 960 will provide such functions. The support module 960 manages all of the vDUs 114 from an observability standpoint to ensure it is running properly and if there are any issues with the vDUs 114, notifications will be provided. The support module 960 is provided on the public network 900 to monitor any of the vDUs 114 across any of the availability zones.

The master modules 912 thus create and manage the kubernetes clusters and create the vDUs 114 and the support module 960, and the support module 960 then supports the vDUs 114. Once the vDUs 114 are created, they run independently, but if a vDU fails (as identified by the support module 960) then the master module 912 can restart the vDU 114.

Once the software (e.g., clusters, vDUs 114, support module 960, master module 912, and others) is set up and running, the user voice and data communications received at the towers 111*a* and is sent over the path of communication A so that the voice and data communications is transmitted from tower 111*a*, to a vDU 114, and then to the vCU 115 in a Kubernetes cluster 931. This path of communication A is separate from the path of communication B for management of the DUs for creation and stability purposes.

Observability Framework

As noted above, OBF brings visibility into the performance and operations of the CNFs with near real-time results. This collected data will be used to optimize networks through its Closed Loop Automation module, which executes procedures to provide automatic scaling and healing while minimizing manual work and reducing errors.

Figure 10:
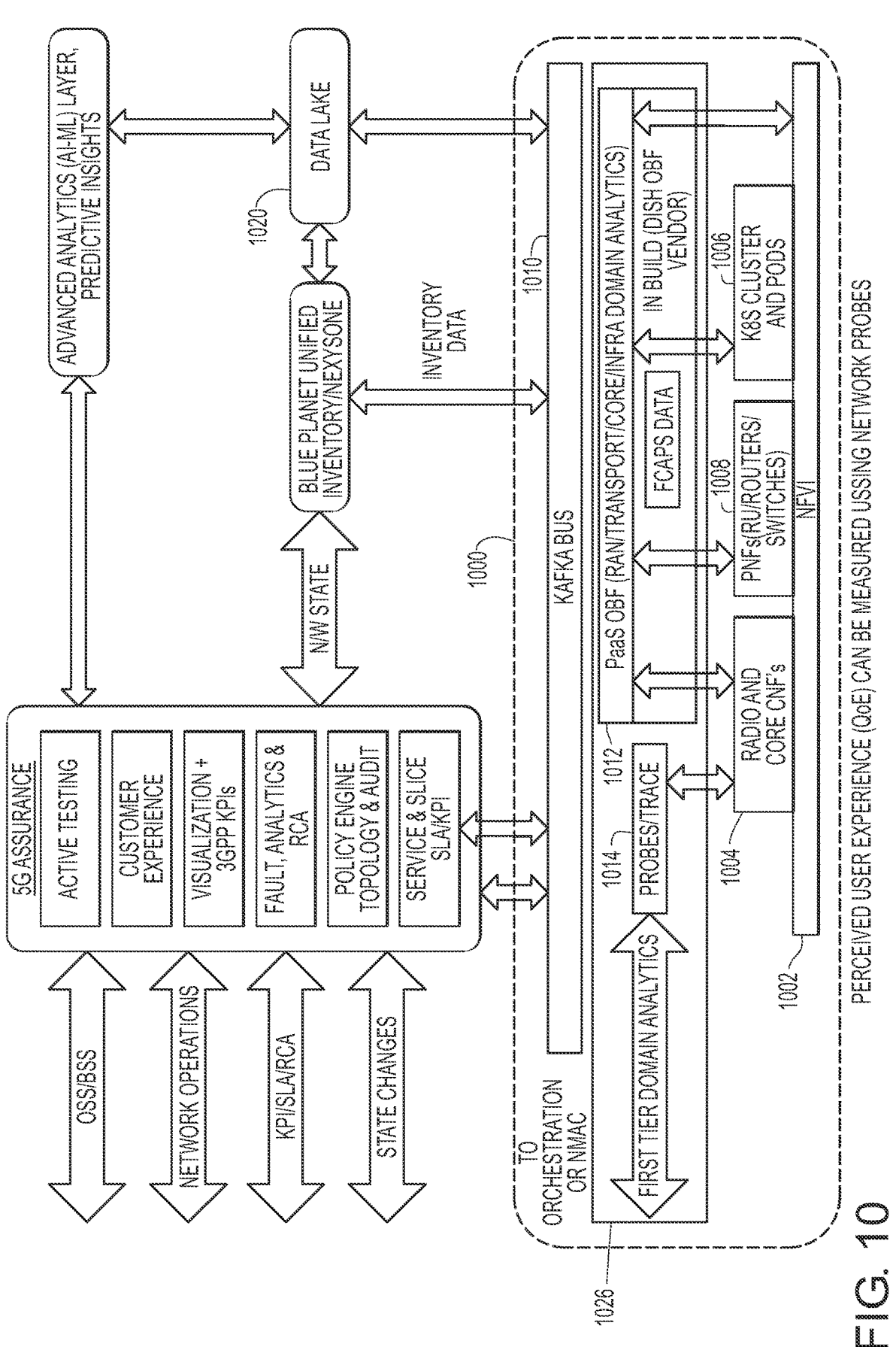
FIG. 10 illustrates the network described of FIG. 9 and others, and also explains how data is collected according to various embodiments.

This is shown in FIG. 10, which is described below. FIG. 10 is another representation of components of the network described with respect to FIG. 9 above but also explains how data is collected according to various embodiments. The system 1000 includes the networked components as well as the observability layers.

First, a network functions virtualization infrastructure ("NFVI") 1002 encompasses the networking hardware and software needed to support and connect virtual network functions in carrier networks. This includes the kubernetes cluster as discussed herein.

On top of the NVFI 1002, there are various domains, including the Radio (or RAN) and Core CNFs 1004, kubernetes clusters and pods (e.g., containers) 1006 and physical network functions ("PNFs") 1008. The PNFs may include hardware components such as an RU (e.g., RRU 113), routers, switches and other hardware components of the cellular network. These domains are not exhaustive and there may be other domains that could be included as well.

The domains transmit their data using probes/traces 1014 to a common source, namely a Platform as a Server ("PaaS") OBF layer 1012. The PaaS OBF layer 1012 may be located within the support module 960 on the public network 900 of FIG. 9 so that it is connected to all of the vDUs 114 and vCUs 115 to pull all of the data from the RANs and Core CNFs 1004. As such, all of the data relating to the RANs and Core CNFs 1004 are retrieved by the same entity deploying and operating each of the vDUs 114 of the RANs as well as the operator of the Core CNFs 1004. In other words, the data and observability of these functions do not need to be requested from vendors of these items and instead are transmitted to the same source which is running these functions, such as the administrator of the cellular network.

The data retrieved are key performance indicators ("KPI") and alarms/faults. KPI are the critical indicators of progress toward performing cellular communications and operations of the cellular network. KPIs provides a focus for strategic and operational improvement, create an analytical basis for decision making and help focus attention on what matters most. Performing observability with the use of KPIs includes setting targets (the desired level of performance) and tracking progress against that target.

The PaaS OBF and event bus retrieves the distributed data collection system so that such data can be monitored. This system uses the kubernetes cluster structure, uses event handling as an intermediate node of data convergence, and finally use data storage for storing the collected and analyzed data.

In this system, the actual data collection tasks may be divided into two different functions. First the PaaS OBF is responsible for collecting data from each data domain and transmitting it to event bus and then, the event bus is responsible for persistent storage of data collected from event logging after aggregation. The master is responsible for maintaining the deployment of the PaaS OBF and event bus and monitoring the execution of these collection tasks.

The PaaS OBF performs the actual collection task after registering with the master module. Among the tasks, the PaaS OBF aggregates the collected data into the event bus according to the configuration information of the task, and stores the data in specified areas of the event bus according to the configuration information of the task and the type of data being collected.

Specifically, when PaaS OBF collects data, it needs to segment data by time (e.g., data is segmented in hours), and the time segment information where data is located is written as well as the collected data entity in the event bus. In addition, because the collected data is stored in the event bus in the original format, other processing systems can transparently consume the data in the event bus without making any changes.

In the process of executing the actual collection task, the PaaS OBF also needs to maintain the execution of the collection task, and regularly reports it to the specific event bus, waiting for the master to pull and cancel the consumption. By processing the heartbeat data reported by the subordinate event handler, the controller can monitor the execution of the collection task of the PaaS OBF and the event bus.

As can be seen, all of the domains are centralized in a single layer PaaS OBF. If some of the domains are provided by some vendors and other by other vendors and these vendors would typically collect data at their networks, the PaaS OBF collects all of the data over all vendors and all domains in a single layer and stores the data in a centralized in long term storage using the event bus. This data is all accessible to the system at a centralized database or centralized network, such as network 900 discussed above with regard to FIG. 9. Because all of the data is stored in one common area from various different domains and even from product managed by different vendors, the data can then be utilized in a much more efficient and effective manner.

There are two types of storage areas for collection of the data. The PaaS OBF is the first storage. In this regard, the collection of data is short term storage by collecting data on a real time basis on the same cloud network where the core of the RAN is running and where the master modules are running (as opposed to collecting the data individually at the vendor sites). In this regard, the data is centralized for short term storage, as described above.

There is also a second storage, which is longer term storage on the same cloud network as the first storage 1016 and the core of the RAN. This second data storage allows data that can be used by any applications without having to request the data on a database or network in a cloud separate from the core and master modules.

There are other storage types as well such as a data lake 1020 which provides more of a permanent storage for data history purposes.

It should be noted that the data collected for all storage types are centralized to be stored on the public network, such as the public network 900 discussed above with regard to FIG. 9.

Figure 11:
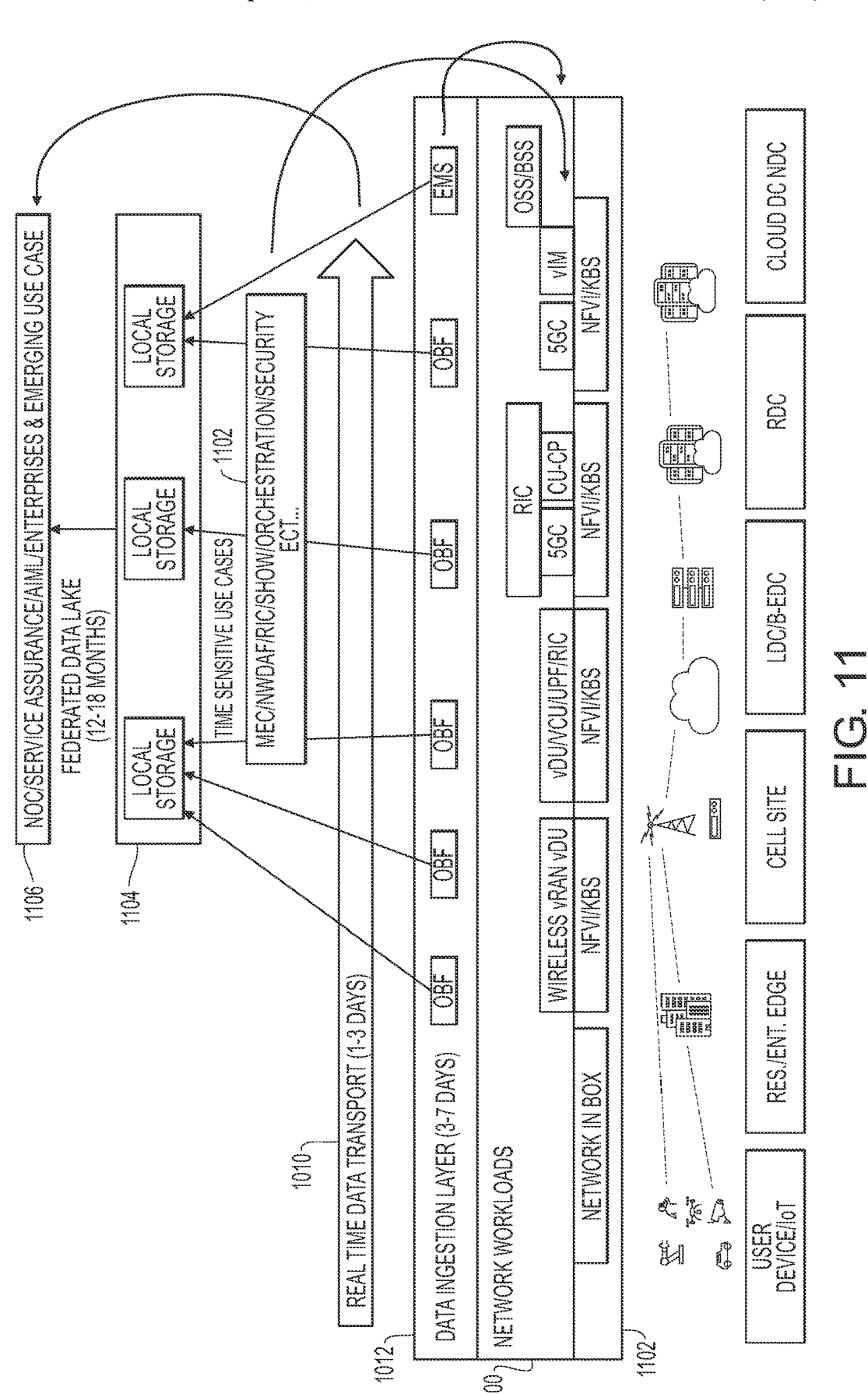
FIG. 11 illustrates an overall architecture of the OBF as well as the layers involved.
Figure 12:
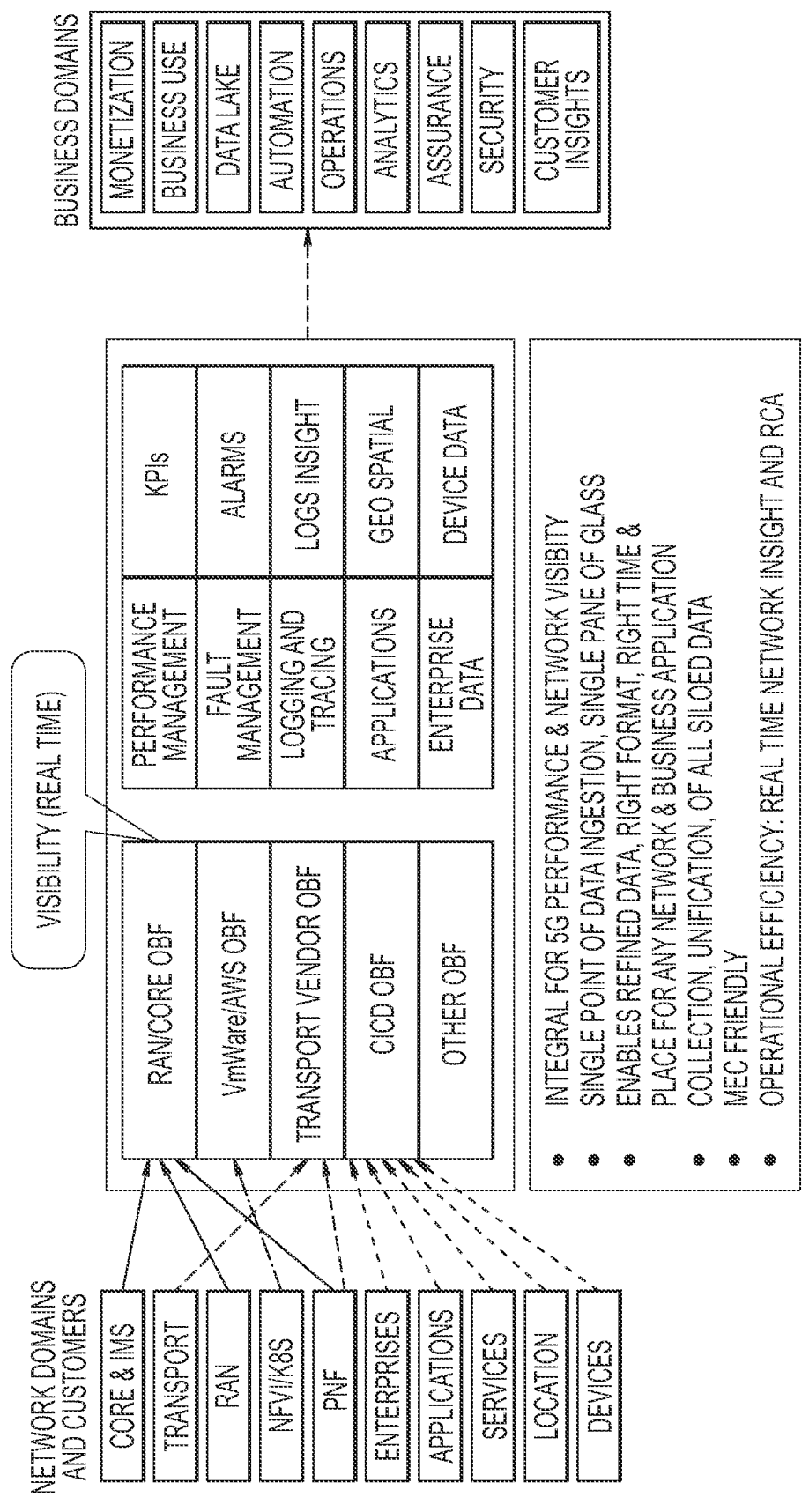
FIG. 12 illustrates an overall architecture of the OBF as well as the layers involved.

FIGS. 11 and 12 show an overall architecture of the OBF as well as the layers involved. First, in FIG. 11, there are three layers shown: the PaaS OBF layer 1012, the event handling layer 1010 (also shown in FIG. 10) and the storage layer 1104. There are time sensitive use applications 1102 which use the data directly from the event handling layer 1010 for various monitoring and other applications which need data on a more real-time basis, such as MEC, security, orchestration, etc. Various applications may pull data from the PaaS OBF layer since this is a real-time data gathering.

There are other use cases 1106 that can obtain data either from the PaaS OBF layer 1012, the event handling layer 1010 and the storage layer 1104, depending on the applications. Some applications may be NOC, service reassurance, AIML, enterprises, and emerging use.

As shown in FIG. 11, there are more details on various domains 1100, such as cell sites (vDU, vRAN, etc.), running on the NFVI 1002 layer. Also, as shown, the NFVI receives data from various hardware devices/sites, such as from cell sites, user devices, RDC, and so on.

In FIG. 12, the network domains and potential customers/users are shown on the left with core and IMS, transport, RAN, NFC/kubernetes (K8S), PNF, enterprises, applications, services, location, and devices. All of these domains are collected in one centralized location using various OBF collection means. For example, data from the core and IMS, RAN, and NFC/kubernetes domains are collected using the RAN/Core OBF platform of the PaaS layer 1012. Also, data from the RAN and PNF domains are collected on the transport OBF layer. In any event, all of the data from the various domains and systems, whether or not there are multiple entities/vendors managing the domains, are collected at a single point or single database and on a common network/server location. This allows the applications (called "business domains" in the right-hand side of FIG. 12) to have a single point of contact to retrieve whatever data is needed for those applications, such as security, automation, analytics, assurance, and so forth.

Detecting the Power Outage

Utilizing, for example, the OBF 701/801 and configuration of FIGS. 7 and 8 described above, the instant application provides for a system and method of detecting a power outage and operating accordingly.

The power outage at the RRU can be detected in several ways. First, a sensor 208 such as a voltage sensor on the AC power line can detect the outage. This detected outage can then be reported to the network controller or network operation center 610 via the network. In particular, the outage can be reported to the OBF, which can recognize the notification and take appropriate action.

Another option is the power outage is reported to the network controller or network operation center 610 by a third party such as a power company, network subscribers, or unknown third parties over the internet. Finally, a human or machine at the network operation center 610 may become aware of the power outage and inform the network control software. According to embodiments herein, a power outage can be more quickly recognized and handled through the use of the OBF. The OBF can recognize and react to a power outage notification more quickly than a traditional network control system and human operator. This is due to the enhanced computational power of the cloud, and lack of reliance on human operators who are prone to human error and lack of situational awareness.

Power Saving Measures

As discussed above, several actions can be taken to conserve power stored in the batteries 305 associated with of the RRUs 113. The power storage 305 can maintain operation of the RRU 113 for a duration on the order of hours. However, this duration varies from a short number of days to less than an hour depending on the storage capacity of the battery. Ideally, service time on backup power should be maximized to avoid a service disruption during a long power outage. But increasing the storage capacity of power storage 305 is expensive, particularly when multiplied by the large number of RRUs operating in a modern 5G network. Accordingly, service time is increased by implementing one or more efficiency-increasing measures. As noted above, these measures are implemented by the RRU 113 in response to an RPC 710 from the network control software.

In some embodiments, a power saving amount is constantly detected by the network, either by means of a processor at a cell site or at another location within the cloud computing network. The system will consistently make determinations as to whether or not to take further power saving measures by taking into consideration, among other things, an amount of power being saved by current measures or by the current scheme being utilized by the cell site. The power saving amount may be an amount saved compared to when the cell site is working in its natural state (e.g., without any measures being taken), or may be an amount saved as compared to a predetermined goal. Further, the power saving amount may be taken into consideration when providing a power consumption instruction, which may be any instruction regarding how much power should be used at a cell site, which may take into consideration how much power is being saved as compared to a threshold or predetermined amount at any given time.

One approach is temporarily reducing a number of channels operating on the RRU 113. Generally, the number of simultaneous users that can be supported by an RRU is proportional to the number of operating channels at that RRU. Accordingly, reducing the number of channels may result in greater latency times for users within the RRU transmission area. However, service can be maintained for a longer time during the power outage.

For example, the base station management program checks how much power consumption would result in one hour of service using reserve battery capacity. Once this calculation is completed, the base station management program shuts off RRU 113, reduces the channels or bands used by RRU 120, or takes another power saving measure to ensure one hour of service.

Another approach is to temporarily reduce the bands in operation by RRU 113. For example, if higher frequency bands consume more energy per data transmission, those bands can be shut down by the cell site to reduce power consumption, while mid and low bands can remain operation. This increases the spectral efficiency of the cell site.

Another option is to temporarily reduce a number of carriers operating on the RRU 120. There are a large number of small carriers that operate on the networks of large carriers. These small carriers lease the network bandwidth of the large carriers to provide cellular service to their customers. During a power outage the carrier operating the cellular network can prioritize its own carrier service, or preferred small carrier clients during a power outage. This would maintain better performance for those carriers maintaining operation during the power outage by freeing up channels for preferred carrier customers.

Still another option is to reduce transmission power on one or more channels for the duration of the power outage. This will reduce the transmission range of the RRU, potentially shrinking its coverage area. Moreover, it can reduce the transmission speed of communications with UEs, even if they are within range. However, some level of service is maintained for a longer period during the outage.

Another power saving procedure is to convert 4T4R (i.e. 4 transmitter, 4 receiver) transmission within the cell to 1T4R. In order to improve transmission speeds under 5G, multiple parallel transmitters and receivers are used in the RRU and the UE. However, when power savings is prioritized over transmission speed, it is possible to shut down transmitters in the RRU, resulting in 1T4R transmission. This saves power in the cellular base station.

Another power saving (or network continuity) option is to transport a mobile base station (either small or micro cell) into an area covered by a permanent cell. This would either provide coverage after the permanent cell has run out of backup power storage, or would allow the permanent cell to shut down while not disrupting service. The mobile base station includes either its own battery storage or a generator as a power source. In some embodiments, the cellular base station management program sends an alert to a human operator to transport the mobile base station into a specific area in need of additional coverage support. The mobile base station can also provide a location to a self-driving vehicle equipped with a mobile base station, so that the vehicle can move to that location in need of cell service coverage.

Similarly, the cellular base station management program can send an alert to send a mobile generator to a cellular base station that is almost out of power storage. This alert is sent to either a human being, or to a self-driving vehicle. This way, the base stations most in need of additional power can be kept operational by supply of external power during an outage.

Finally, overlapping cell sites that normally provide redundant coverage can be shut down. For example, the cell site operating a macro cell covering a broad area can be shut down when that macro cell that is also covered with small cells and micro cells. This has an added power savings advantage because of the fewer bands operating on the small cells and micro cells. Conversely, redundant small cells and micro cells can be shut down in favor of only using the macro cell site to provide coverage. However, during peak traffic times, all of the cells will operate to maximize coverage and bandwidth.

In any case, when a power saving amount is below a threshold, the cell site (or a processor operating at the cell site or otherwise controlling the cell site) can reduce power to or otherwise turn off one or more small cells or microcells utilized by the cell site. Further, when the power saving amount is above the threshold, particularly after the reduction of power or turning off the one or more small cells or microcells utilized by the cell site, but also at any time, the cell site or processor may increase power to or otherwise turn on the one or more small cells or microcells.

In some embodiments, the cellular base station management program performs the above-described power saving procedures in phases. This is done to ensure that at least an hour of battery power is available at each phase. For example, the program first turns off transmission of one RRU 113 and checks remaining battery capacity to ensure 1 hour of service supported. Second, the program turns off one or two of the bands (e.g. the 71 frequency is maintained, while others are shut off). Third the program switches from 4T4R transmission to 1T4R transmission. At each phase, the program maintains communication with the cellular base station and checks remaining battery capacity.

The calculation of whether the remaining battery capacity meets or exceeds a threshold can be performed either at the base station or at the cloud server by the management program. The phased power control can also be performed using real time or non-real time control. In other words, there can be a pre-programmed procedure for progressing through incremental power saving procedures. Alternatively, there can be real-time control in which the management program uses up-to-date data and alerts to control the base station.

Reduced Power Consumption During Normal Operation

Many of the above power saving measures can be used even when there is no power outage in the network. This can reduce operating costs and increase energy efficiency over the long term. For example, micro cells and small cells can be shut down overnight in areas that will see reduced traffic. For example, if a micro cell is operating inside an office building to provide service to workers during normal business hours, it can be shut down overnight. Alternatively, such a cell can shut down certain channels or carriers to reduce power consumption.

In another example, micro cells or small cells along a roadway can implement the power saving measures during periods of lower vehicle traffic. Similarly, micro cells or small cells near sidewalks can implement power saving measures during periods of lower pedestrian traffic.

Figure 14:
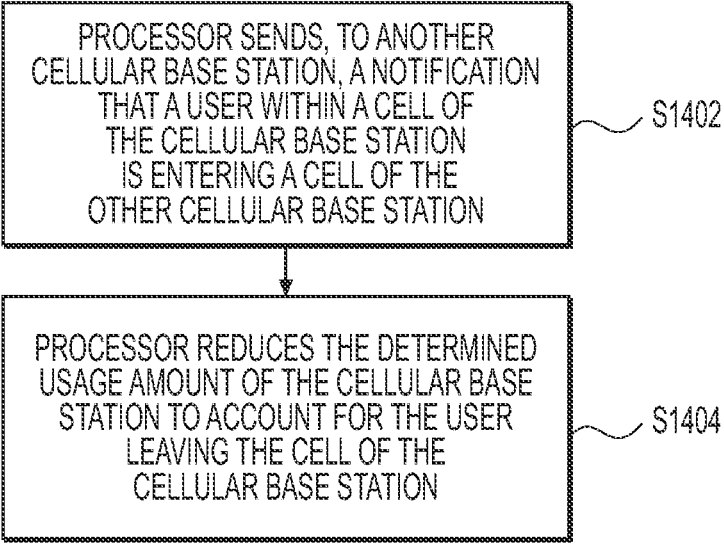
FIG. 14 illustrates a method according to one embodiment.

Another way to control when power saving measures are implemented is by cell-to-cell communication, as shown in FIG. 14. In particular, a cellular base station may send a notification to a neighboring cellular base station that a user is about to leave its cell, and enter the cell of the neighboring base station (S1402). In this scenario, the neighboring cell can discontinue or postpone power saving measures it is performing, and the base station sending the notification can implement new power saving measures, as traffic reduction is expected with the departure of the user (S1404). In other words, the usage characteristic (or usage amount) calculations are updated to account for the movement of the user. Instead of this communication occurring directly between cellular base stations, it may also be routed through the AI management program.

It should be appreciated that any combination of the above approaches can be also used to extend the operation time of an RRU running on backup battery power.

There is such a thing as a "black box" type approach having various propriety interfaces and storing data at the vendor locations, different databases and at different server locations and networks. This embodiment requires different EMS systems and managed by different entities. It has less transparency and more difficulty in obtaining and using data in a simplified manner.

On the other hand, certain embodiments use multiple systems, which are making different systems or layers, including the OBF layer, a centralized configuration management, and the inventory or storage layer, which are discussed above.

Embodiments of the cell site, network, system, and method described herein improve the functioning of a computer network (i.e. cellular network) by providing rapid power saving measures. To do this, the various embodiments use analysis techniques limited to the realm of computer technology, such as machine learning, cellular communications, and cloud computing. Moreover, the cell site, network, system, and method use computer hardware such as servers and network communication hardware, including hardware specialized for cellular communication. Finally, the problem of extending cell tower operation during a power outage is a problem limited to the realm of computer technology, as these towers are operated using computer. Thus, embodiments herein are necessarily rooted in computer technology in order to overcome a problem specifically arising in the realm of computer networks.

In some embodiments, the management program monitors traffic through the small cells, microcells, and macro cells, and determines which is have the largest impact on network data transmission. Based on this information, the management program can shut down the cell that has the least impact on performance to conserve power while maintaining high data speeds. For example, if the management program learns that the in an area where a small cell overlaps a macro cell, and the small cell is performing more data transmission, the program will shut down the macro cell to conserve power.

Another way that power consumption and bandwidth are optimized is by analyzing user profiles. Certain users are enrolled in premium data priority plans, and are given higher bandwidth by the base station management program. Priority users may also include hospitals, key industrial installations, and the military.

Moreover, the program analyzes the type of activity engaged in by the user to determine which users need more bandwidth at any given time. For example, if user a user is engaged in gaming (and/or has paid for priority data), that user can be dedicated one slice of the spectrum. Meanwhile, a user using low-data functions can be allocated less bandwidth. This way, neither user will experience reduced speeds, even though limited resources are being allocated.

Method of Controlling Cellular Base Station

Figure 13:
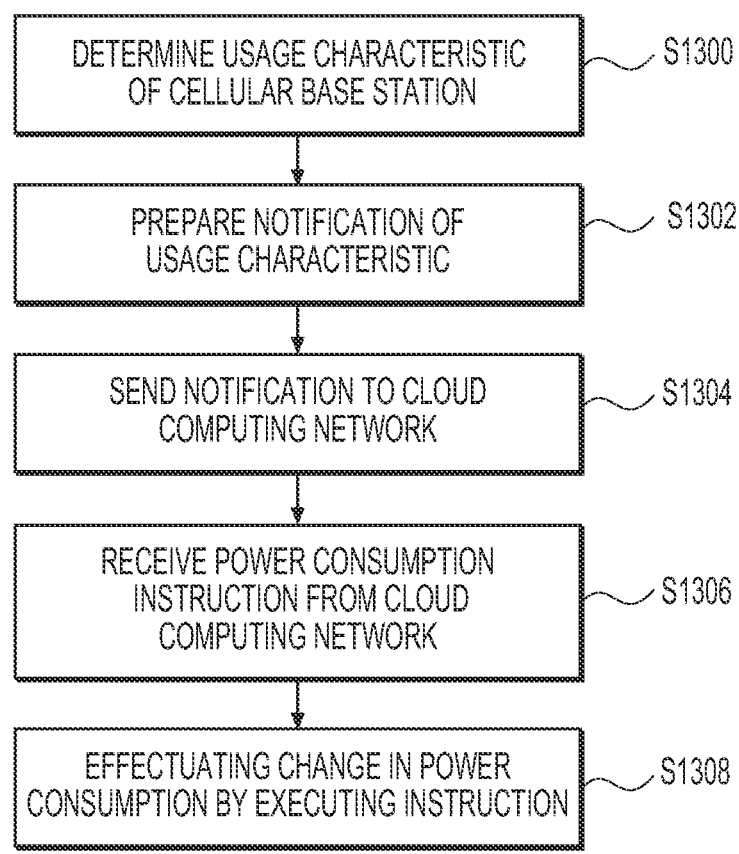
FIG. 13 illustrates a method according to one embodiment.

FIG. 13 shows a method according to embodiments herein of controlling a cellular base station. The cellular base station can be controlled with respect to ongoing power consumption. The control may take into consideration a power outage or, in some embodiments, may be exclusive of a power outage and may take into consideration usage characteristics of the cellular base station. The method may control ongoing power consumption at a cellular base station via at least one processor of the cellular base station executing instructions. The processor may be a hardware processor that may include a central processing unit (CPU), circuitry, and/or other hardware, and may be a component or subcomponent, or in communication with, one or more of the controllers described with respect to cell tower 111*a* described in FIGS. 7 and 8 and the like.

In some embodiments, a cellular provider or other entity installs an artificial intelligence cellular base station management program on a cloud computing network. The cloud computing network may be the network described heretofore. The artificial intelligence cellular base station management program is configured to monitor the cellular base station and evaluate a usage amount of the cellular base station.

Step S1300 includes a determination of a usage characteristic of the cellular base station. This may be performed by the hardware processor of the cellular base station, by way of the processor executing instructions including such a determination. The processor may be located remote from the cellular base station, or may be at the cell site 110.

In step S1300, the processor executes instructions to determine such a usage characteristic. The usage characteristic may be an amount of power consumed by the cellular base station, which may take into consideration multiple variables, such as the amount of users (or subscribers) currently utilizing the cellular base station via active calls, messages, data usage or the like, as well as other variables controlling power throughput at the cellular base station. Further, the usage characteristic may be a predetermined or learned characteristic relating to an expected or assumed amount of use for the cellular base station. As an example, it may be understood that a cellular base station may use less power and/or otherwise provide less output at night, or on weekends, or at a time where subscribers may not be using the network at a high volume. The management program may also send a power saving instruction to the cellular base station in when the usage amount is below a threshold. The threshold is set as a usage amount where power saving measures can be implemented without users experiencing a drop in network performance (e.g. reduced data speeds). Alternatively, the threshold can be set at a point where the drop in network performance is small enough to be considered acceptable (e.g. not below the user's expectations or contract data speeds). The threshold may be variable and may include multiple thresholds, whereby upon reaching each threshold or staying below each threshold, another action may commence or end.

In step S1302, the processor prepares a notification of the usage characteristic. The notification will be able to be recognized by an artificial intelligence cellular base station management program, identified above, that operates on the cloud computing network described heretofore. This usage amount may be one or more of a number of users within the cell controlled by the cellular base station, or a data transmission amount in the cell. In step S1304, the processor sends the notification to the cloud computing network, e.g. by a cell site router 306 via a network. In step S1306, the processor receives the power saving instruction from the cloud computing network, e.g. by cell site router 306 and the network. This may occur at a time point where the program, utilizing artificial intelligence or otherwise, evaluates that the notification meets a criteria for changing power consumption at the cellular base station. In step S1308, the processor effectuates the change in power consumption at the cellular base station by executing the power saving instruction.

In some embodiments, operational parameters of the artificial intelligence cellular base station management program using machine learning may be adjusted. This can be done before or after the artificial intelligence cellular base station management program is installed on the cloud computing network. For example, the machine learning adjustments could be performed prior to installation by operating the management program on a simulated network. The adjustments could be performed after installation by performing machine learning in real-time, so that the management program becomes more efficient over time. A more efficient cellular network provides greater coverage and/or reduced resource consumption given equal operating conditions.

Harvesting Control Data and Improvement to Network

After a period of using the management program to control the cellular base stations, data is collected concerning the power usage and efficacy of the power saving measures. Based on this, the management program calculates the size of the backup battery needed for each cellular base station. In some embodiments, the desired battery size for each base station is the minimum battery size that provides uninterrupted service. Alternatively, some interruption may be acceptable in unusual circumstances, such as a power outage lasting more than 12 hours. On the other hand, even uninterrupted service may be considered unacceptable if a substantial reduction in data performance is needed to maintain battery power. In those circumstances, a larger battery may be desired than would be needed to only maintain baseline operation. The desired battery size is calculated using usage data from controlling the cellular base stations, and artificial intelligence.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a radio access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

Although the invention has been described with reference to embodiments herein, those embodiments do not limit the scope of the invention. Modifications to those embodiments or different embodiments may fall within the scope of the invention.

What is claimed is:

1. A method of controlling ongoing power consumption at a cellular base station via at least one processor of the cellular base station executing instructions so as to perform a process comprising:

collecting Simple Network Management Protocol (SNMP) traps from Remote Radio Units (RRUs) that are geographically remote from each other in the cloud computing network;

converting the SNMP traps to power-related events, wherein the power-related events include power outages;

determining a usage characteristic of the cellular base station;

preparing a notification of the usage characteristic of the cellular base station and the power-related events of the RRUs that is configured to be recognized by an artificial intelligence cellular base station management program operating on a cloud computing network;

sending the notification to the cloud computing network so as to be recognized by the artificial intelligence cellular base station management program;

receiving one or more power consumption instructions from the cloud computing network when the artificial intelligence cellular base station management program evaluates that the notification meets a criteria for changing power consumption at the cellular base station; and effectuating a change in power consumption at the cellular base station by executing the one or more power consumption instructions.

2. The method of claim 1, wherein the one or more power consumption instructions comprises a first power consumption instruction to turn off transmission of one radio unit of the cellular base station.

3. The method of claim 2, wherein if a power saving amount from the first power consumption instruction is below a first threshold, the one or more power consumption instructions further comprises a second power consumption instruction to turn off a communication band of the cellular base station.

4. The method of claim 3, wherein if a power saving amount from the second power consumption instruction is below a second threshold, the one or more power consumption instructions further comprises a third power consumption instruction to switch to one transmitter, four receiver (1T4R) communication.

5. The method of claim 1, wherein the determining the usage characteristic of the cellular base station includes determining a change in quantity of users within a coverage area of the cellular base station.

6. The method of claim 1, wherein the one or more power consumption instructions is an instruction to reduce a number of channels operated by the cellular base station or reduce a number of carriers operating on the cellular base station.

7. The method of claim 1, wherein the cellular base station is operating a small cell or micro cell, and the method includes powering down the small cell or micro cell when a power saving amount is below a threshold, and the method includes subsequently powering up the small cell or micro cell when the power saving amount reaches the threshold.

8. The method of claim 1, wherein the artificial intelligence cellular base station management program is an Element Management System (EMS) or Network Management System (NMS).

9. The method of claim 1, wherein the artificial intelligence cellular base station management program is a Non-Real-Time Radio Access Network Intelligent Controller (Non-RT RIC).

10. The method of claim 1, further comprising:

sending operating data to the cloud computing network; and adjusting operational parameters of the artificial intelligence cellular base station management program using machine learning based on the operating data.

11. A cellular base station comprising:

a transceiver configured to communicate with at least one user equipment;

a network communicator configured to communicate with a cloud computing network; and a processor configured to:

collect Simple Network Management Protocol (SNMP) traps from Remote Radio Units (RRUs) that are geographic remote from each other in the cloud computing network;

convert the SNMP traps to power-related events, wherein the power-related events include power outages;

determine a usage characteristic of the cellular base station;

prepare a notification of the usage characteristic of the cellular base station and the power-related events of the RRUs that is configured to be recognized by an artificial intelligence cellular base station management program operating on the cloud computing network;

send the notification to the cloud computing network so as to be recognized by the artificial intelligence cellular base station management program;

receive one or more power consumption instructions from the cloud computer network when the artificial intelligence cellular base station management program evaluates that the notification meets a criteria for changing power consumption at the cellular base station; and effectuate a change in power consumption at the cellular base station by executing the one or more power consumption instructions.

12. The cellular base station of claim 11, wherein the one or more power consumption instructions comprises a first power consumption instruction to turn off transmission of one radio unit of the cellular base station.

13. The cellular base station of claim 12, wherein if a power saving amount from the first power consumption instruction is below a first threshold, the one or more power consumption instructions further comprises a second power consumption instruction to turn off a communication band of the cellular base station.

14. The cellular base station of claim 13, wherein if a power saving amount from the second power consumption instruction is below a second threshold, the one or more power consumption instructions further comprises a third power consumption instruction to switch to one transmitter, four receiver (1T4R) communication.

15. The cellular base station of claim 11, wherein the determining the usage characteristic of the cellular base station includes determining a change in quantity of users within a coverage area of the cellular base station.

16. The cellular base station of claim 11, wherein the usage characteristic is a current usage amount of the cellular base station.

17. The cellular base station of claim 15, wherein the cellular base station is operating a small cell or micro cell, and the processor is configured to power down the small cell or micro cell when a power saving amount is below a threshold, and subsequently power up the small cell or micro cell when the power saving amount reaches the threshold.

18. The cellular base station of claim 11, wherein the power saving instruction is an instruction to reduce a number of channels operated by the cellular base station or an instruction to reduce a number of carriers operating on the cellular base station.

19. The cellular base station of claim 11, wherein the artificial intelligence cellular base station management program is an Element Management System (EMS) or Network Management System (NMS).

20. The cellular base station of claim 11, wherein the artificial intelligence cellular base station management program is a Non-Real-Time Radio Access Network Intelligent Controller (Non-RT RIC).

* * * * *